(12) United States Patent
Zhang et al.

(10) Patent No.: US 11,169,362 B2
(45) Date of Patent: Nov. 9, 2021

(54) OPTICAL IMAGING LENS ASSEMBLY

(71) Applicant: Zhejiang Sunny Optical Co., Ltd, Ningbo (CN)

(72) Inventors: Kaiyuan Zhang, Ningbo (CN); Ming Li, Ningbo (CN); Biao Xu, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 269 days.

(21) Appl. No.: 16/274,718

(22) Filed: Feb. 13, 2019

(65) Prior Publication Data
US 2019/0179122 A1    Jun. 13, 2019

Related U.S. Application Data

(63) Continuation of application No. PCT/CN2018/092868, filed on Jun. 26, 2018.

(30) Foreign Application Priority Data

Oct. 25, 2017 (CN) .......................... 201711007397.7
Oct. 25, 2017 (CN) .......................... 201721384690.0

(51) Int. Cl.
G02B 9/64      (2006.01)
G02B 13/00     (2006.01)
G02B 5/00      (2006.01)

(52) U.S. Cl.
CPC ........... *G02B 13/0045* (2013.01); *G02B 9/64* (2013.01); *G02B 5/005* (2013.01)

(58) Field of Classification Search
CPC ....... G02B 13/0045; G02B 9/64; G02B 5/005

USPC .......................................... 359/708, 751, 755
See application file for complete search history.

(56) References Cited

U.S. PATENT DOCUMENTS

| 2016/0085057 | A1 | 3/2016 | Tsai et al. |
| 2016/0377841 | A1 | 12/2016 | Kubota et al. |
| 2018/0143411 | A1* | 5/2018 | Minefuji .................. G02B 9/64 |
| 2018/0231745 | A1 | 8/2018 | Chen |

FOREIGN PATENT DOCUMENTS

GN      106199922 A      12/2016

* cited by examiner

*Primary Examiner* — William Choi
(74) *Attorney, Agent, or Firm* — Hauptman Ham, LLP

(57) ABSTRACT

The present disclosure discloses an optical imaging lens assembly. The lens assembly sequentially includes, along an optical axis from an object side to an image side: a first lens, a second lens, a third lens, a fourth lens, a fifth lens, a sixth lens and a seventh lens, each of the first to seventh lenses having refractive powers. The first lens has a negative refractive power, an object-side surface of the first lens is a convex surface, and an image-side surface of the first lens is a concave surface; an image-side surface of the third lens is a concave surface; an object-side surface of the seventh lens is a concave surface; and a total effective focal length f of the optical imaging lens assembly, an effective focal length f4 of the fourth lens, and an effective focal length f5 of the fifth lens satisfy: $|f/f4|+|f/f5|<1$.

19 Claims, 14 Drawing Sheets

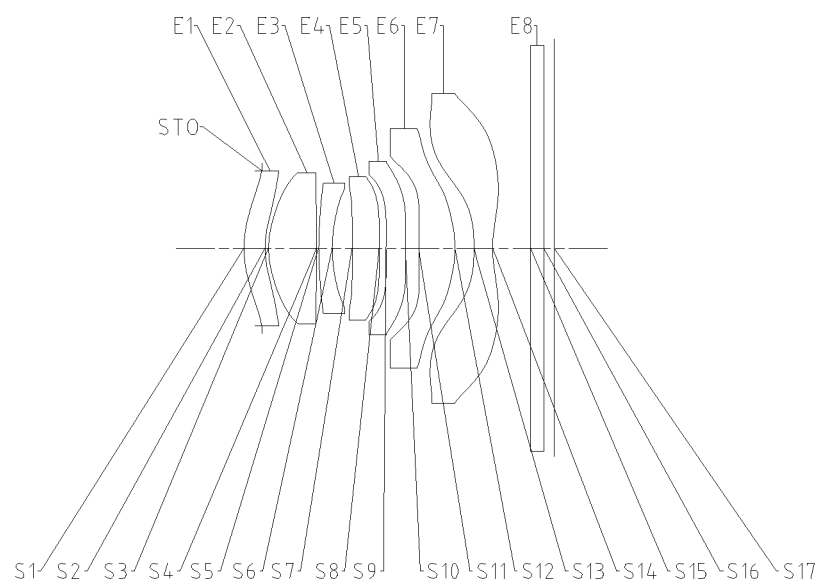
Fig. 1
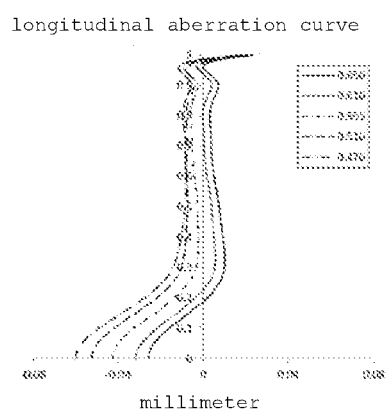
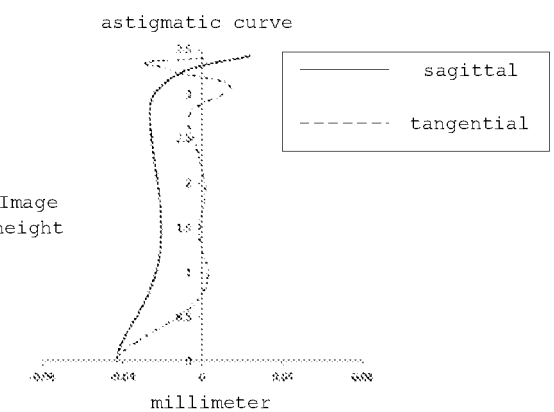
Fig. 2A  Fig. 2B

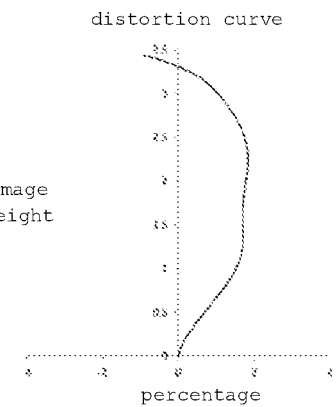 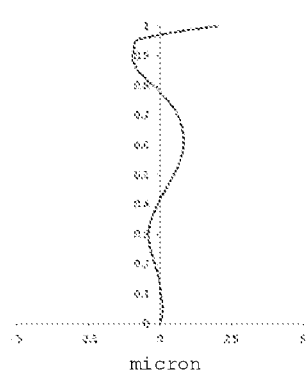
Fig. 2C  Fig. 2D
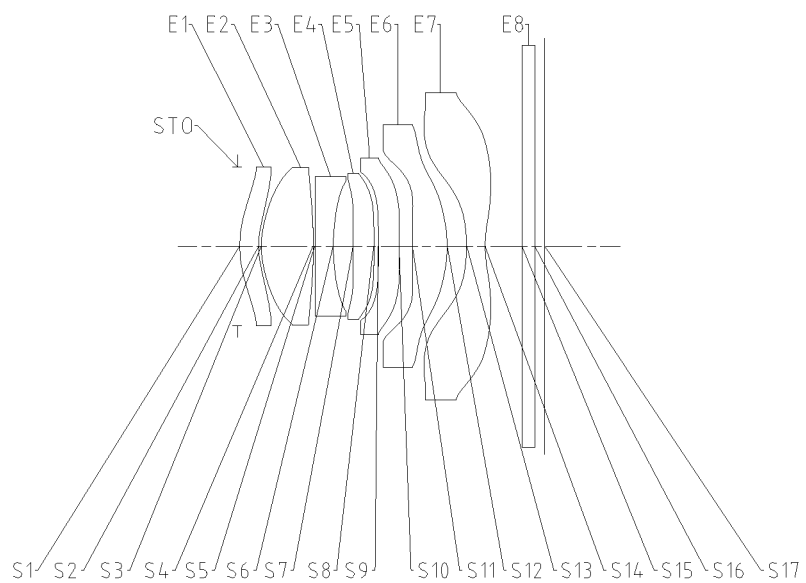
Fig. 3

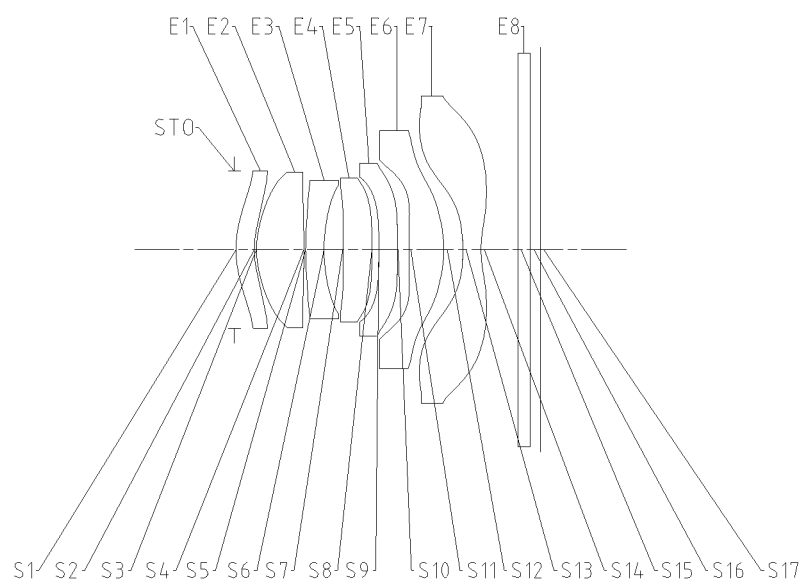
Fig. 9
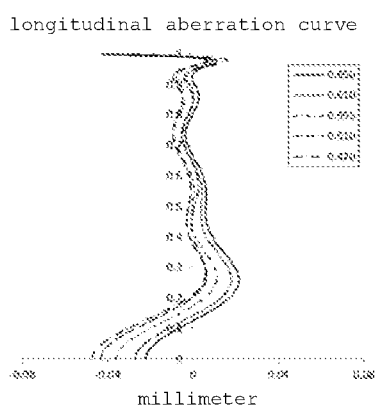 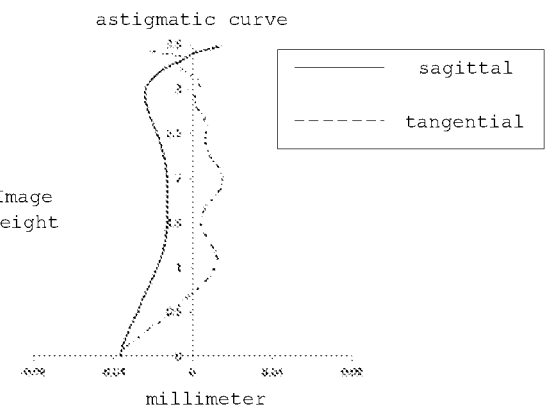
Fig. 10A  Fig. 10B

OPTICAL IMAGING LENS ASSEMBLY

CROSS-REFERENCE TO RELATED APPLICATIONS

This application is a continuation of International Application No. PCT/CN2018/092868, filed on Jun. 26, 2018, which claims priorities and rights to Chinese Patent Application No. 201711007397.7 filed with the China National Intellectual Property Administration (CNIPA) on Oct. 25, 2017 and Chinese Patent Application No. 201721384690.0 filed with the CNIPA on Oct. 25, 2017. The disclosures of aforementioned applications are hereby incorporated by reference in their entireties.

TECHNICAL FIELD

The present disclosure relates to an optical imaging lens assembly, and more specifically to an optical imaging lens assembly including seven lenses.

BACKGROUND

In recent years, with the development of chip technologies such as the charge-coupled device (CCD) or the complementary metal-oxide semiconductor (CMOS), the pixel sizes of chips are getting smaller and smaller, and imaging quality requirements on the counterpart optical imaging lens assemblies are higher and higher, requiring the counterpart imaging lens assemblies having characteristics of high pixel and miniaturization.

In addition, with the popularization of portable electronic devices such as mobile phones or digital cameras, the portable electronic products have more applications, and corresponding requirements have been put forward for the large aperture and high resolution of the counterpart optical imaging lens assemblies.

SUMMARY

The present disclosure provides an optical imaging lens assembly applicable to portable electronic products and may at least solve or partially solve at least one of the above disadvantages in the existing technology, for example, a large aperture imaging lens assembly.

According to an aspect, the present disclosure discloses an optical imaging lens assembly. The lens assembly sequentially includes, along an optical axis from an object side to an image side: a first lens, a second lens, a third lens, a fourth lens, a fifth lens, a sixth lens and a seventh lens, each of the first to seventh lenses having refractive powers. The first lens may have a negative refractive power, an object-side surface of the first lens may be a convex surface, and an image-side surface of the first lens may be a concave surface. An image-side surface of the third lens may be a concave surface. An object-side surface of the seventh lens may be a concave surface. A total effective focal length f of the optical imaging lens assembly, an effective focal length f4 of the fourth lens, and an effective focal length f5 of the fifth lens may satisfy: $|f/f4|+|f/f5|<1$.

In an implementation, the total effective focal length f of the optical imaging lens assembly and an entrance pupil diameter EPD of the optical imaging lens assembly may satisfy: $f/EPD \leq 1.60$.

In an implementation, an effective focal length f1 of the first lens and the total effective focal length f of the optical imaging lens assembly may satisfy: $-0.5<f/f1<0$.

In an implementation, an effective focal length f2 of the second lens and a radius R3 of curvature of an object-side surface of the second lens may satisfy: $1.5<f2/R3<2.5$.

In an implementation, an effective focal length f6 of the sixth lens and a radius R12 of curvature of an image-side surface of the sixth lens may satisfy: $-2<f6/R12<-1$.

In an implementation, the effective focal length f6 of the sixth lens and an effective focal length f7 of the seventh lens may satisfy: $-1.5<f6/f7<-1$.

In an implementation, a center thickness CT4 of the fourth lens on the optical axis and a center thickness CT5 of the fifth lens on the optical axis may satisfy: $0.5<CT4/CT5<2.0$.

In an implementation, a center thickness CT1 of the first lens on the optical axis and a center thickness CT7 of the seventh lens on the optical axis may satisfy: $1.00 \leq CT1/CT7<1.50$.

In an implementation, a total track length TTL of the optical imaging lens assembly and a half of a diagonal length ImgH of an effective pixel area on an image plane of the optical imaging lens assembly may satisfy: $TTL/ImgH \leq 1.5$.

In an implementation, a radius R13 of curvature of the object-side surface of the seventh lens and a radius R14 of curvature of an image-side surface of the seventh lens may satisfy: $|R13/R14| \leq 2$.

In an implementation, a radius R5 of curvature of an object-side surface of the third lens and a radius R6 of curvature of the image-side surface of the third lens may satisfy: $1.5<(R5+R6)/(R5-R6) \leq 80$.

According to another aspect, the present disclosure discloses an optical imaging lens assembly. The lens assembly sequentially includes, along an optical axis from an object side to an image side: a first lens, a second lens, a third lens, a fourth lens, a fifth lens, a sixth lens and a seventh lens having refractive powers. An object-side surface of the first lens may be a convex surface, and an image-side surface of the first lens may be a concave surface. An image-side surface of the third lens may be a concave surface. An object-side surface of the seventh lens may be a concave surface. A center thickness CT1 of the first lens on the optical axis and a center thickness CT7 of the seventh lens on the optical axis may satisfy: $1.00 \leq CT1/CT7<1.50$.

In the present disclosure, multiple lenses (e.g., seven lenses) are used. By reasonably setting the refractive powers and the surface types of the lenses, the center thicknesses of the lenses and the axial spacing distances between the lenses, the optical imaging lens assembly has at least one advantageous effect such as ultra-thin, miniaturization, large aperture, low sensitivity, good processability, high pixel, and high imaging quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve and a lateral color curve of the optical imaging lens assembly according to Embodiment 1;

FIG. 3 is a schematic structural diagram illustrating an optical imaging lens assembly according to Embodiment 2 of the present disclosure;

FIG. 9 is a schematic structural diagram illustrating an optical imaging lens assembly according to Embodiment 5 of the present disclosure;

FIGS. 10A-10D respectively illustrate a longitudinal aberration curve, an astigmatic curve, a distortion curve and a lateral color curve of the optical imaging lens assembly according to Embodiment 5;

DETAILED DESCRIPTION OF EMBODIMENTS

Figure 4A:
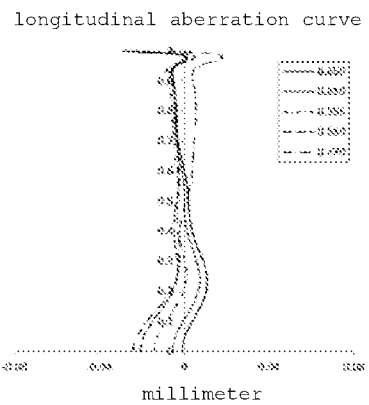
FIGS. 4A-4D respectively illustrate a longitudinal aberration curve, an astigmatic curve, a distortion curve and a lateral color curve of the optical imaging lens assembly according to Embodiment 2.

For better understanding the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of description. Specifically, shapes of spherical surfaces or aspheric surfaces shown in the accompanying drawings are examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area in proximity to the optical axis. If the surface of a lens is a convex surface and the position of the convex portion of the convex surface is not defined, at least the portion of the surface of the lens in the paraxial area is the convex portion; if the surface of a lens is a concave surface and the position of the concave portion of the concave surface is not defined, at least the portion of the surface of the lens in the paraxial area is the concave portion. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure will be described below in detail.

The optical imaging lens assembly according to exemplary implementations of the present disclosure may include, for example, seven lenses having refractive powers, that is, a first lens, a second lens, a third lens, a fourth lens, a fifth lens, a sixth lens, and a seventh lens. The seven lenses are sequentially arranged from an object side to an image side along an optical axis.

In an exemplary implementation, the first lens may have a negative refractive power, an object-side surface of the first lens may be a convex surface, and an image-side surface of the first lens may be a concave surface. The second lens has a positive refractive power or a negative refractive power. The third lens has a positive refractive power or a negative refractive power, and an image-side surface of the third lens may be a concave surface. The fourth lens has a positive refractive power or a negative refractive power. The fifth lens has a positive refractive power or a negative refractive power. The sixth lens has a positive refractive power or a negative refractive power. The seventh lens has a positive refractive power or a negative refractive power, and an object-side surface of the seventh lens is a concave surface.

In an exemplary implementation, the second lens may have a positive refractive power, and an object-side surface of the second lens may be a convex surface.

In an exemplary embodiment, an object-side surface of the third lens may be a convex surface.

In an exemplary embodiment, the sixth lens may have a positive refractive power, and an image-side surface of the sixth lens may be a convex surface.

In an exemplary embodiment, the seventh lens may have a negative refractive power, and an image-side surface of the seventh lens may be a concave surface.

In an exemplary embodiment, the optical imaging lens assembly of the present disclosure may satisfy the conditional expression: f/EPD≤1.60. Here, f is the total effective focal length of the optical imaging lens assembly, and EPD is the entrance pupil diameter of the optical imaging lens assembly. More specifically, f and EPD may further satisfy: 1.46≤f/EPD≤1.60. The smaller the f-number Fno (i.e., the total effective focal length f of the lens assembly/the entrance pupil diameter EPD of the lens assembly) of the optical imaging lens assembly, the larger the aperture of the lens assembly, and the greater the amount of entering light during a given time unit. The reduction of the f-number Fno may effectively enhance the brightness of the image plane, so that the lens assembly can better satisfy the shooting requirements in case of insufficient lights such as cloudy days, or at dusk, and has a large aperture advantage. By configuring the lens assembly to satisfy the conditional expression: f/EPD≤1.60, the illumination of the image plane may be enhanced in the process of increasing the amount of light, thereby improving the imaging effect of the lens assembly in a dark environment.

In an exemplary embodiment, the optical imaging lens assembly of the present disclosure may satisfy the conditional expression: |f/f4|+|f/f5|<1. Here, f is the total effective focal length of the optical imaging lens assembly, f4 is the effective focal length of the fourth lens, and f5 is the effective focal length of the fifth lens. More specifically, f, f4, and f5 may further satisfy: 0<|f/f4|+|f/f5|<0.50, for example, 0.02≤|f/f4|+|f/f5|≤0.44. Properly configuring the refractive powers of the lenses is beneficial to achieve an imaging effect of high pixel.

In an exemplary embodiment, the optical imaging lens assembly of the present disclosure may satisfy the conditional expression: −0.5<f/f1<0. Here, f is the total effective focal length of the optical imaging lens assembly, and f1 is the effective focal length of the first lens. More specifically, f and f1 may further satisfy: −0.25<f/f1<−0.10, for example, −0.19≤f/f1≤−0.16. By properly controlling the negative refractive power of the first lens, the negative third-order spherical aberration and the positive fifth-order spherical aberration contributed by the first lens are properly controlled, such that the negative third-order spherical aberration and the positive fifth-order spherical aberration contributed by the first lens can cancel out the positive third-order spherical aberration and the negative fifth-order spherical aberration generated by the subsequent positive lenses (i.e., lenses having positive refractive powers between the first lens and the image side), thereby ensuring good imaging quality of the axial field-of-view.

In an exemplary embodiment, the optical imaging lens assembly of the present disclosure may satisfy the conditional expression: −1.5<f6/f7<−1. Here, f6 is the effective focal length of the sixth lens, and f7 is the effective focal length of the seventh lens. More specifically, f6 and f7 may further satisfy: −1.5<f6/f7<−1.3, for example, −1.44≤f6/f7≤−1.32. By properly controlling the ratio between the refractive power of the sixth lens and the refractive power of the seventh lens, the remaining spherical aberration by balancing the sixth lens and the seventh lens can be used to balance the spherical aberration generated by the first five lenses (i.e., the first lens to the fifth lens), thereby realizing fine-tuning and control of the spherical aberration of the system, and improving the precise control of the axial field-of-view aberration.

In an exemplary embodiment, the optical imaging lens assembly of the present disclosure may satisfy the conditional expression: 1.00≤CT1/CT7<1.50. Here, CT1 is the center thickness of the first lens on the optical axis, and CT7 is the center thickness of the seventh lens on the optical axis. More specifically, CT1 and CT7 may further satisfy: 1.00≤CT1/CT7<1.30, for example, 1.00≤CT1/CT7≤1.27. Proper control of the ratio of the center thicknesses of the first lens to the seventh lens may ensure that the total track length TTL of the lens assembly is controlled within a reasonable range while ensuring good processability of the lens assembly, thereby avoiding a large burden on the vertical dimensions of the system.

In an exemplary embodiment, the optical imaging lens assembly of the present disclosure may satisfy the conditional expression: 1.5<f2/R3<2.5. Here, f2 is the effective focal length of the second lens, and R3 is the radius of curvature of the object-side surface of the second lens. More specifically, f2 and R3 may further satisfy: 1.7<f2/R3<2.5, for example, 1.73≤f2/R3≤2.46. By properly controlling the ratio of f2 to R3, both the object-side surface and the image-side surface of the second lens may have reasonable refractive powers, thereby ensuring that the second lens meets the optical performance requirements of the system and has a sensitivity as low as possible.

In an exemplary embodiment, the optical imaging lens assembly of the present disclosure may satisfy the conditional expression: −2<f6/R12<−1. Here, f6 is the effective focal length of the sixth lens, and R12 is the radius of curvature of the image-side surface of the sixth lens. More specifically, f6 and R12 may further satisfy: −1.90<f6/R12<−1.50, for example, −1.83≤f6/R12≤−1.56. By properly controlling the ratio of f6/R12, the amount of the contributed astigmatism of the image-side surface of the sixth lens is within a reasonable range, and the amount of the contributed astigmatism of the image-side surface of the sixth lens may well balance the amount of astigmatism accumulated by the front-side lenses (i.e., the lenses between the object side and the sixth lens), making the optical imaging system have good imaging quality on both the tangential plane and the sagittal plane.

In an exemplary embodiment, the optical imaging lens assembly of the present disclosure may satisfy the conditional expression: 0.5<CT4/CT5<2.0. Here, CT4 is the center thickness of the fourth lens on the optical axis, and CT5 is the center thickness of the fifth lens on the optical axis. More specifically, CT4 and CT5 may further satisfy: 0.9<CT4/CT5<1.7, for example, 0.98≤CT4/CT5≤1.59. By properly controlling the ratio of the center thicknesses of the fourth lens to the fifth lens, the contributed distortions of the fourth lens and the fifth lens may be controlled within a reasonable range, so that the final distortion of each field-of-view is controlled below 3% to avoid the need for software debugging later.

In an exemplary embodiment, the optical imaging lens assembly of the present disclosure may satisfy the conditional expression: TTL/ImgH≤1.5. Here, TTL is the total track length of the optical imaging lens assembly (i.e., the distance from the center of the object-side surface of the first lens to the image plane of the optical imaging lens assembly on the optical axis), and ImgH is the half of the diagonal length of the effective pixel area on the image plane of the optical imaging lens assembly. More specifically, TTL and ImgH may further satisfy: 1.43≤TTL/ImgH≤1.46. By properly controlling the ratio of TTL to ImgH, it is advantageous for achieving an optical imaging lens assembly having both ultra-thin thickness and high pixel.

In an exemplary embodiment, the optical imaging lens assembly of the present disclosure may satisfy the conditional expression: 1.5<(R5+R6)/(R5−R6)≤80. Here, R5 is the radius of curvature of the object-side surface of the third lens, and R6 is the radius of curvature of the image-side surface of the third lens. More specifically, R5 and R6 may further satisfy: 1.68≤(R5+R6)/(R5−R6)≤79.1. By properly controlling the radii of curvature of the object-side surface and the image-side surface of the third lens, the contributed coma of the third lens can be controlled within a reasonable range, so that the imaging quality of the axial field-of-view and the off-axis field-of-view does not significantly degrade due to the contributed coma.

In an exemplary embodiment, the optical imaging lens assembly of the present disclosure may satisfy the conditional expression: |R13/R14|≤2. Here, R13 is the radius of curvature of the object-side surface of the seventh lens, and R14 is the radius of curvature of the image-side surface of the seventh lens. More specifically, R13 and R14 may further satisfy: 1.3<|R13/R14|≤2, for example, 1.37≤|R13/R14|≤1.91. Properly controlling the ratio of the radius of curvature of the object-side surface to the radius of curvature of the image-side surface of the seventh lens is advantageous for improving the precise control of the axial field-of-view aberration.

In an exemplary embodiment, the optical imaging lens assembly may alternatively include at least one diaphragm STO for further improving the imaging quality of the lens assembly. For example, the diaphragm may be disposed between the object side and the first lens.

Alternatively, the optical imaging lens assembly may further include an optical filter for correcting the color deviation and/or a cover glass for protecting the photosensitive element on the image plane.

The optical imaging lens assembly according to the above implementations of the present disclosure may use multiple lenses, for example, seven lenses as described above. By reasonably distributing the refractive power, the surface type of each lens, the center thickness of each lens, the axial spacing distances between the lenses, etc., the volume of the lens assembly may be effectively reduced, the sensitivity of the lens assembly may be reduced, and the processability of the lens assembly may be improved, making the optical imaging lens assembly more conducive to production and processing and applicable to portable electronic products. In addition, the optical imaging lens assembly with the above configuration also has beneficial effects such as ultra-thin, large aperture, high pixel and high imaging quality.

In the implementations of the present disclosure, at least one of the surfaces of the each lens is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving the distortion aberration and improving the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having seven lenses is described as an example in the implementations, the optical imaging lens assembly is not limited to include seven lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 1 shows the surface type, the radius of curvature, the thickness, the material and the conic coefficient of each lens of the optical imaging lens assembly in Embodiment 1. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.1774 | | | |
| S1 | aspheric | 1.9372 | 0.3388 | 1.54 | 55.7 | −0.7169 |
| S2 | aspheric | 1.5671 | 0.0534 | | | −7.6189 |
| S3 | aspheric | 1.4733 | 0.7748 | 1.55 | 64.1 | −1.3397 |
| S4 | aspheric | 45.6099 | 0.0319 | | | −18.9177 |
| S5 | aspheric | 4.4792 | 0.2200 | 1.67 | 20.4 | 3.6615 |
| S6 | aspheric | 2.4621 | 0.3172 | | | −0.6150 |
| S7 | aspheric | 21.6723 | 0.4359 | 1.55 | 64.1 | −72.1060 |
| S8 | aspheric | 18.9508 | 0.1141 | | | −85.0589 |
| S9 | aspheric | 12.6707 | 0.3120 | 1.67 | 20.4 | −8.3003 |
| S10 | aspheric | 12.4148 | 0.2088 | | | 69.1787 |
| S11 | aspheric | 12.2159 | 0.5854 | 1.55 | 64.1 | 33.0857 |
| S12 | aspheric | −1.7549 | 0.3047 | | | −6.7598 |
| S13 | aspheric | −3.2031 | 0.3000 | 1.54 | 55.7 | −1.3025 |
| S14 | aspheric | 1.8178 | 0.6128 | | | −6.8068 |
| S15 | spherical | infinite | 0.2100 | 1.52 | 64.2 | |
| S16 | spherical | infinite | 0.1713 | | | |
| S17 | spherical | infinite | | | | |

As can be obtained from Table 1, the object-side surface and the image-side surface of each one of the first lens E1 to the seventh lens E7 are aspheric surfaces. In the present embodiment, the surface type x of each aspheric surface may be defined by, but not limited to, the following aspheric formula:

$$x = \frac{ch^2}{1+\sqrt{1-(k+1)c^2h^2}} + \sum A_i h^i \quad (1)$$

Here, x is the sag to the aspheric vertex, when the aspheric surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric surfaces S1-S14 in Embodiment 1.

TABLE 2

| surface number | A4 | A6 | A8 | A10 | A12 |
|---|---|---|---|---|---|
| S1 | −3.9768E−02 | 9.7233E−03 | −7.7534E−02 | 1.8204E−01 | −2.8031E−01 |
| S2 | 4.4667E−02 | −3.1302E−01 | 5.1259E−01 | −6.0762E−01 | 6.3228E−01 |
| S3 | −8.9871E−02 | 3.3714E−02 | −1.5395E−01 | 5.4449E−01 | −8.2914E−01 |
| S4 | −1.3255E−01 | 3.6741E−01 | −7.0919E−01 | 8.8183E−01 | −6.5104E−01 |
| S5 | −2.0432E−01 | 4.5307E−01 | −7.1546E−01 | 6.9863E−01 | −2.4970E−01 |
| S6 | −7.3833E−02 | 9.6591E−02 | 1.9058E−01 | −8.6916E−01 | 1.5617E+00 |
| S7 | −8.6647E−02 | 2.0603E−01 | −9.6163E−01 | 2.9346E+00 | −6.0252E+00 |
| S8 | −1.5042E−01 | 1.4002E−01 | −4.5287E−01 | 1.4133E+00 | −3.1544E+00 |
| S9 | −2.2207E−01 | 2.5240E−01 | −7.3991E−01 | 2.1956E+00 | −4.2270E+00 |
| S10 | −1.5980E−01 | −5.6877E−02 | 1.4361E−01 | 1.3976E−01 | −6.0705E−01 |
| S11 | 2.4497E−02 | −2.7461E−01 | 2.4998E−01 | −1.1097E−01 | 7.2476E−03 |
| S12 | 1.2629E−01 | −3.0430E−01 | 2.4206E−01 | −1.2242E−01 | 5.6033E−02 |
| S13 | −6.9117E−02 | −2.5198E−01 | 3.3066E−01 | −1.7764E−01 | 5.4432E−02 |
| S14 | −1.9203E−01 | 1.1414E−01 | −4.6772E−02 | 1.4920E−02 | −3.9452E−03 |

| surface number | A14 | A16 | A18 | A20 |
|---|---|---|---|---|
| S1 | 2.6401E−01 | −1.4489E−01 | 4.2765E−02 | −5.2788E−03 |
| S2 | −5.0532E−01 | 2.6453E−01 | −7.9137E−02 | 1.0210E−02 |
| S3 | 7.7297E−01 | −4.5782E−01 | 1.5661E−01 | −2.3329E−02 |
| S4 | 2.5869E−01 | −3.5765E−02 | −4.5412E−03 | 8.5803E−05 |
| S5 | −2.2800E−01 | 3.0720E−01 | −1.3277E−01 | 1.9074E−02 |
| S6 | −1.4896E+00 | 6.9209E−01 | −6.4171E−02 | −3.8123E−02 |
| S7 | 8.0921E+00 | −6.7678E+00 | 3.1894E+00 | −6.4254E−01 |
| S8 | 4.1317E+00 | −3.0715E+00 | 1.2106E+00 | −1.9661E−01 |
| S9 | 4.7152E+00 | −2.9898E+00 | 1.0021E+00 | −1.3792E−01 |
| S10 | 7.0922E−01 | −4.1097E−01 | 1.2079E−01 | −1.4331E−02 |
| S11 | 9.7471E−03 | −2.0491E−03 | 0.0000E+00 | 0.0000E+00 |
| S12 | −2.1116E−02 | 5.1196E−03 | −6.7247E−04 | 3.6261E−05 |

TABLE 2-continued

| | | | | |
|---|---|---|---|---|
| S13 | −1.0305E−02 | 1.2006E−03 | −7.9327E−05 | 2.2828E−06 |
| S14 | 7.9812E−04 | −1.0891E−04 | 8.6258E−06 | −2.9394E−07 |

In Embodiment 1, the total effective focal length f of the optical imaging lens assembly=4.05 mm; the effective focal length f1 of the first lens E1=−22.47 mm; the effective focal length f2 of the second lens E2=2.77 mm; the effective focal length f3 of the third lens E3=−8.59 mm; the effective focal length f4 of the fourth lens E4=−293.01 mm; the effective focal length f5 of the fifth lens E5=−1801.76 mm; the effective focal length f6 of the sixth lens E6=2.85 mm; the effective focal length f7 of the seventh lens E7=−2.12 mm. The total track length TTL of the imaging lens assembly (i.e., the axial distance from the center of the object-side surface S1 of the first lens E1 to the image plane S17)=4.99 mm. The half of the diagonal length of the effective pixel area on the image plane S17 ImgH=3.43 mm.

The optical imaging lens assembly in Embodiment 1 satisfies:

f/EPD=1.59, here, f is the total effective focal length of the optical imaging lens assembly, and EPD is the entrance pupil diameter of the optical imaging lens assembly;

|f/f4|+|f/f5|=0.02, here, f is the total effective focal length of the optical imaging lens assembly, f4 is the effective focal length of the fourth lens E4, and f5 is the effective focal length of the fifth lens E5;

f/f1=−0.18, here, f is the total effective focal length of the optical imaging lens assembly, and f1 is the effective focal length of the first lens E1;

f6/f7=−1.35, here, f6 is the effective focal length of the sixth lens E6, and f7 is the effective focal length of the seventh lens E7;

CT1/CT7=1.13, here, CT1 is the center thickness of the first lens E1 on the optical axis, and CT7 is the center thickness of the seventh lens E7 on the optical axis;

f2/R3=1.88, here, f2 is the effective focal length of the second lens E2, and R3 is the radius of curvature of the object-side surface S3 of the second lens E2;

f6/R12=−1.63, here, f6 is the effective focal length of the sixth lens E6, and R12 is the radius of curvature of the image-side surface S12 of the sixth lens E6;

CT4/CT5=1.40, here, CT4 is the center thickness of the fourth lens E4 on the optical axis, and CT5 is the center thickness of the fifth lens E5 on the optical axis;

TTL/ImgH=1.45, here, TTL is the total track length of the optical imaging lens assembly, and ImgH is the half of the diagonal length of the effective pixel area on the image surface S17;

(R5+R6)/(R5−R6)=3.44, here, R5 is the radius of curvature of the object-side surface S5 of the third lens E3, and R6 is the radius of curvature of the image-side surface S6 of the third lens E3;

|R13/R14|=1.76, here, R13 is the radius of curvature of the object-side surface S13 of the seventh lens E7, and R14 is the radius of curvature of the image-side surface S14 of the seventh lens E7.

In addition, FIG. 2A shows the longitudinal aberration curve of the optical imaging lens assembly according to Embodiment 1, representing deviations of focal points where lights of different wavelengths converge after passing through the lens assembly. FIG. 2B shows the astigmatic curve of the optical imaging lens assembly according to Embodiment 1, representing a curvature of the tangential image plane and a curvature of the sagittal image plane. FIG. 2C shows the distortion curve of the optical imaging lens assembly according to Embodiment 1, representing degrees of distortion at different viewing angles. FIG. 2D shows the lateral color curve of the optical imaging lens assembly according to Embodiment 1, representing deviations of different heights of images on the image plane formed by light passing through the lens assembly. As can be seen according to FIGS. 2A to 2D, the optical imaging lens assembly according to Embodiment 1 can achieve good imaging quality.

Embodiment 2

An optical imaging lens assembly according to Embodiment 2 of the present disclosure is described below with reference to FIGS. 3-4D. In the present embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 3 shows the surface type, the radius of curvature, the thickness, the material and the conic coefficient of each lens of the optical imaging lens assembly in Embodiment 2. The units of the radius of curvature and the thickness are both millimeters (mm).

TABLE 3

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | 0.0378 | | | |
| S1 | aspheric | 1.8945 | 0.3102 | 1.54 | 55.7 | −0.8667 |
| S2 | aspheric | 1.5567 | 0.0422 | | | −7.8554 |
| S3 | aspheric | 1.5169 | 0.8458 | 1.55 | 64.1 | −1.3536 |
| S4 | aspheric | −21.0540 | 0.0308 | | | 78.4827 |
| S5 | aspheric | 13.0002 | 0.3000 | 1.67 | 20.4 | 37.3990 |
| S6 | aspheric | 3.2809 | 0.3267 | | | 0.4118 |
| S7 | aspheric | 29.1890 | 0.3359 | 1.55 | 64.1 | −94.8868 |
| S8 | aspheric | 18.3088 | 0.0746 | | | −98.9186 |
| S9 | aspheric | 12.3091 | 0.3423 | 1.67 | 20.4 | 44.2284 |
| S10 | aspheric | 12.2604 | 0.2140 | | | 69.2640 |
| S11 | aspheric | 9.9145 | 0.5727 | 1.55 | 64.1 | 21.4068 |
| S12 | aspheric | −1.7852 | 0.3184 | | | −7.6624 |
| S13 | aspheric | −3.0419 | 0.3000 | 1.54 | 55.7 | −1.5289 |
| S14 | aspheric | 1.7527 | 0.6045 | | | −6.0613 |
| S15 | spherical | infinite | 0.2100 | 1.52 | 64.2 | |
| S16 | spherical | infinite | 0.1630 | | | |
| S17 | spherical | infinite | | | | |

As can be obtained from Table 3, in Embodiment 2, the object-side surface and the image-side surface of each one of the first lens E1 to the seventh lens E7 are aspheric surfaces. Table 4 shows the high-order coefficients of the aspheric surfaces applicable in Embodiment 2. Here, the surface types of the aspheric surfaces may be defined by the formula (1) given in the above Embodiment 1.

In Embodiment 2, the total effective focal length f of the optical imaging lens assembly=4.13 mm; the effective focal length f1 of the first lens E1=−23.95 mm; the effective focal length f2 of the second lens E2=2.63 mm; the effective focal length f3 of the third lens E3=−6.67 mm; the effective focal length f4 of the fourth lens E4=−90.96 mm; the effective focal length f5 of the fifth lens E5=2571.93 mm; the effective focal length f6 of the sixth lens E6=2.82 mm; the effective focal length f7 of the seventh lens E7=−2.03 mm. The total track length TTL of the imaging lens assembly=4.99 mm. The half ImgH of the diagonal length of the effective pixel area on the image plane S17=3.41 mm.

FIG. 4A shows the longitudinal aberration curve of the optical imaging lens assembly according to Embodiment 2,

TABLE 4

| surface number | A4 | A6 | A8 | A10 | A12 |
|---|---|---|---|---|---|
| S1 | −4.3215E−02 | 1.9031E−02 | −9.4746E−02 | 1.8740E−01 | −2.6846E−01 |
| S2 | 3.2628E−02 | −2.4697E−01 | 2.4460E−01 | 4.8567E−02 | −3.2681E−01 |
| S3 | −1.0505E−01 | 7.5819E−02 | −2.8183E−01 | 8.6046E−01 | −1.2611E+00 |
| S4 | −1.3017E−01 | 3.7241E−01 | −7.6504E−01 | 9.6229E−01 | −5.9092E−01 |
| S5 | −1.6847E−01 | 4.2426E−01 | −8.7464E−01 | 1.2568E+00 | −1.0900E+00 |
| S6 | −4.3171E−02 | 4.0929E−02 | 2.2264E−01 | −9.7346E−01 | 2.1131E+00 |
| S7 | −7.3324E−02 | 1.9065E−01 | −1.1478E+00 | 3.4785E+00 | −6.5943E+00 |
| S8 | −2.4126E−01 | 9.3508E−01 | −3.9576E+00 | 9.9095E+00 | −1.5513E+01 |
| S9 | −3.1232E−01 | 1.0592E+00 | −4.1768E+00 | 1.0351E+01 | −1.5853E+01 |
| S10 | −1.8932E−01 | 2.7994E−01 | −1.1192E+00 | 2.5484E+00 | −3.2594E+00 |
| S11 | 2.5521E−01 | −1.7261E−01 | −1.8130E−01 | 1.2834E−01 | −2.4238E−02 |
| S12 | 1.0548E−01 | −1.8380E−01 | 1.5970E−02 | 8.9025E−02 | −5.6229E−02 |
| S13 | −1.0153E−01 | −1.6324E−01 | 2.2658E−01 | −1.1069E−01 | 2.8684E−02 |
| S14 | −2.2720E−01 | 1.7315E−01 | −9.5288E−02 | 3.9610E−02 | −1.2144E−02 |

Figure 4B:
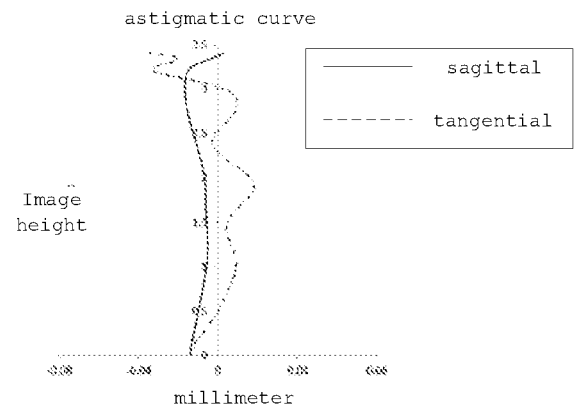
Figure 4C:
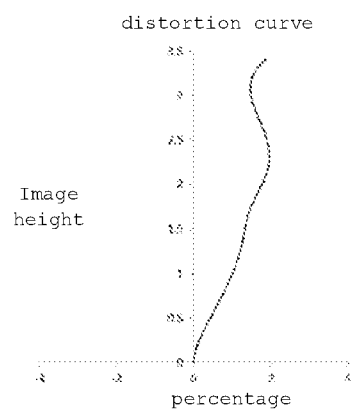
Figure 4D:
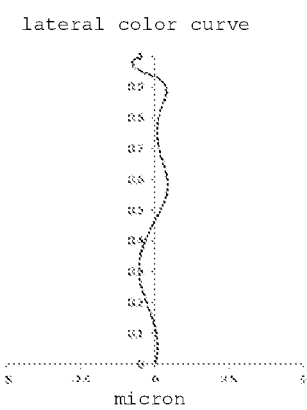

| surface number | A14 | A16 | A18 | A20 |
|---|---|---|---|---|
| S1 | 2.4677E−01 | −1.3393E−01 | 3.8946E−02 | −4.6882E−03 |
| S2 | 3.5007E−01 | −1.9692E−01 | 5.9488E−02 | −7.5741E−03 |
| S3 | 1.0988E+00 | −5.9118E−01 | 1.8213E−01 | −2.4554E−02 |
| S4 | −1.2401E−02 | 2.5820E−01 | −1.4736E−01 | 2.7097E−02 |
| S5 | 4.5926E−01 | 1.9815E−02 | −9.3085E−02 | 2.4313E−02 |
| S6 | −2.7079E+00 | 2.0657E+00 | −8.5669E−01 | 1.4842E−01 |
| S7 | 7.9146E+00 | −5.8711E+00 | 2.4757E+00 | −4.5247E−01 |
| S8 | 1.5170E+01 | −9.0107E+00 | 2.9865E+00 | −4.2492E−01 |
| S9 | 1.5032E+01 | −8.6294E+00 | 2.7589E+00 | −3.7901E−01 |
| S10 | 2.4787E+00 | −1.1230E+00 | 2.8062E−01 | −2.9742E−02 |
| S11 | −7.5539E−02 | 5.7594E−02 | −1.5882E−02 | 1.5526E−03 |
| S12 | 1.4402E−02 | −1.5232E−03 | 5.4075E−06 | 7.2130E−06 |
| S13 | −4.2057E−03 | 3.2511E−04 | −9.2559E−06 | −1.2495E−07 |
| S14 | 2.5750E−03 | −3.5105E−04 | 2.7426E−05 | −9.2627E−07 | representing deviations of focal points where lights of different wavelengths converge after passing through the lens assembly. FIG. 4B shows the astigmatic curve of the optical imaging lens assembly according to Embodiment 2, representing a curvature of the tangential image plane and a curvature of the sagittal image plane. FIG. 4C shows the distortion curve of the optical imaging lens assembly according to Embodiment 2, representing degrees of distortion at different viewing angles. FIG. 4D shows the lateral color curve of the optical imaging lens assembly according to Embodiment 2, representing deviations of different heights of images on the image plane formed by light passing through the lens assembly. As can be seen according to FIGS. 4A to 4D, the optical imaging lens assembly according to Embodiment 2 can achieve good imaging quality.

Embodiment 3

Figure 5:
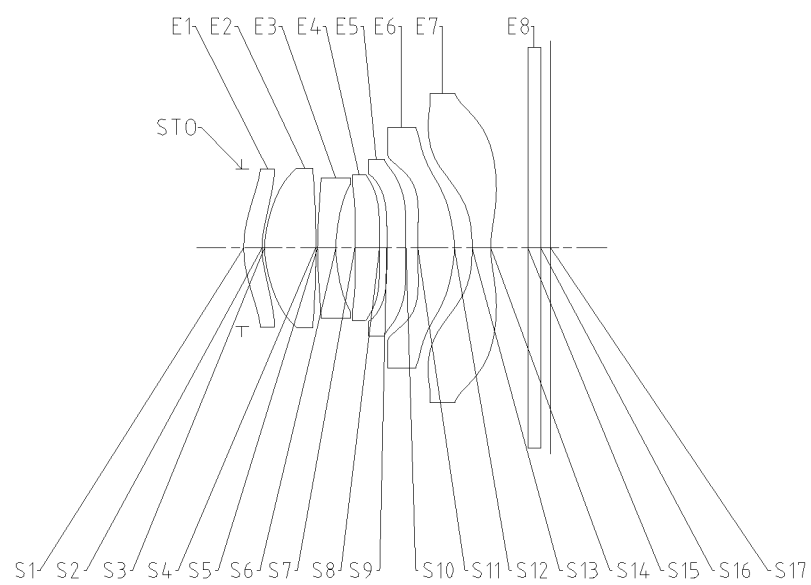
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 5 shows the surface type, the radius of curvature, the thickness, the material and the conic coefficient of each lens of the optical imaging lens assembly in Embodiment 3. The units of the radius of curvature and the thickness are both millimeters (mm).

TABLE 5

| surface number | surface type | radius of curvature | thickness | refractive index | abbe number | conic coefficient |
|---|---|---|---|---|---|---|
| OBJ | spherical | infinite | infinite | | | |
| STO | spherical | infinite | 0.0300 | | | |
| S1 | aspheric | 1.9236 | 0.3000 | 1.54 | 55.7 | −0.8690 |
| S2 | aspheric | 1.5856 | 0.0406 | | | −7.9766 |
| S3 | aspheric | 1.5397 | 0.8320 | 1.55 | 64.1 | −1.3646 |
| S4 | aspheric | −125.5596 | 0.0300 | | | 99.0000 |
| S5 | aspheric | 5.2655 | 0.3000 | 1.67 | 20.4 | 2.9163 |
| S6 | aspheric | 2.5933 | 0.3065 | | | −0.3738 |
| S7 | aspheric | 22.6211 | 0.3984 | 1.55 | 64.1 | −4.2671 |
| S8 | aspheric | 22.5013 | 0.1213 | | | −53.5691 |
| S9 | aspheric | 14.1742 | 0.3104 | 1.67 | 20.4 | 50.7831 |
| S10 | aspheric | 12.7852 | 0.1919 | | | 66.8448 |
| S11 | aspheric | 12.5866 | 0.5956 | 1.55 | 64.1 | 21.9171 |
| S12 | aspheric | −1.7229 | 0.2909 | | | −6.2197 |
| S13 | aspheric | −3.0139 | 0.3000 | 1.54 | 55.7 | −1.4366 |
| S14 | aspheric | 1.7815 | 0.6024 | | | −6.3895 |
| S15 | spherical | infinite | 0.2100 | 1.52 | 64.2 | |
| S16 | spherical | infinite | 0.1610 | | | |
| S17 | spherical | infinite | | | | |

As can be obtained from Table 5, in Embodiment 3, the object-side surface and the image-side surface of each one of the first lens E1 to the seventh lens E7 are aspheric surfaces. Table 6 shows the high-order coefficients of the aspheric surfaces applicable in Embodiment 3. Here, the surface types of the aspheric surfaces may be defined by the formula (1) given in the above Embodiment 1.

TABLE 6

| surface number | A4 | A6 | A8 | A10 | A12 | A14 | A16 | A18 | A20 |
|---|---|---|---|---|---|---|---|---|---|
| S1 | −4.3347E−02 | 1.8910E−02 | −1.0709E−01 | 2.2944E−01 | −3.4193E−01 | 3.2054E−01 | −1.7552E−01 | 5.1287E−02 | −6.1944E−03 |
| S2 | 3.4283E−02 | −2.7133E−01 | 3.0470E−01 | −4.3235E−02 | −2.3620E−01 | 2.9867E−01 | −1.8199E−01 | 5.7982E−02 | −7.6621E−03 |

TABLE 6-continued

| surface number | A4 | A6 | A8 | A10 | A12 | A14 | A16 | A18 | A20 |
|---|---|---|---|---|---|---|---|---|---|
| S3 | −9.6749E−02 | 3.6023E−02 | −1.7794E−01 | 6.6117E−01 | −9.9609E−01 | 8.7102E−01 | −4.7048E−01 | 1.4614E−01 | −1.9946E−02 |
| S4 | −1.3424E−01 | 4.4381E−01 | −1.1695E+00 | 2.0909E+00 | −2.4216E+00 | 1.7937E+00 | −8.0713E−01 | 1.9638E−01 | −1.9392E−02 |
| S5 | −1.7096E−01 | 4.4771E−01 | −1.1228E+00 | 2.0208E+00 | −2.3450E+00 | 1.6801E+00 | −6.8004E−01 | 1.2174E−01 | −2.3179E−03 |
| S6 | −4.1617E−02 | 2.6136E−02 | 2.3395E−01 | −9.8981E−01 | 2.1987E+00 | −2.8954E+00 | 2.2701E+00 | −9.7225E−01 | 1.7488E−01 |
| S7 | −7.2990E−02 | 1.8948E−01 | −9.1237E−01 | 2.6370E+00 | −4.9576E+00 | 5.9987E+00 | −4.5121E+00 | 1.9309E+00 | −3.5776E−01 |
| S8 | −2.0525E−01 | 5.2312E−01 | −1.7839E+00 | 4.1245E+00 | −6.4044E+00 | 6.3489E+00 | −3.8364E+00 | 1.2922E+00 | −1.8620E−01 |
| S9 | −2.7913E−01 | 6.5373E−01 | −2.1807E+00 | 5.1875E+00 | −7.9514E+00 | 7.5714E+00 | −4.3521E+00 | 1.3934E+00 | −1.9287E−01 |
| S10 | −1.8289E−01 | 1.9114E−01 | −6.9974E−01 | 1.6172E+00 | −2.0951E+00 | 1.5941E+00 | −7.1285E−01 | 1.7363E−01 | −1.7738E−02 |
| S11 | 1.1044E−02 | −1.0992E−01 | −2.3413E−01 | 6.0724E−01 | −6.4656E−01 | 4.0119E−01 | −1.5574E−01 | 3.5716E−02 | −3.6443E−03 |
| S12 | 1.1931E−01 | −2.3498E−01 | 9.7435E−02 | 1.6606E−02 | −1.8685E−02 | 2.7257E−03 | 6.3816E−04 | −2.1628E−04 | 1.7033E−05 |
| S13 | −9.1644E−02 | −1.9390E−01 | 2.6777E−01 | −1.4000E−01 | 4.0788E−02 | −7.2246E−03 | 7.7586E−04 | −4.6510E−05 | 1.1916E−06 |
| S14 | −2.2049E−01 | 1.5818E−01 | −8.0342E−02 | 3.0849E−02 | −8.9927E−03 | 1.8666E−03 | −2.5382E−04 | 1.9970E−05 | −6.8145E−07 |

In Embodiment 3, the total effective focal length f of the optical imaging lens assembly=4.12 mm; the effective focal length f1 of the first lens E1=−24.37 mm; the effective focal length f2 of the second lens E2=2.79 mm; the effective focal length f3 of the third lens E3=−8.04 mm; the effective focal length f4 of the fourth lens E4=44458.05 mm; the effective focal length f5 of the fifth lens E5=−215.18 mm; the effective focal length f6 of the sixth lens E6=2.82 mm; the effective focal length f7 of the seventh lens E7=−2.04 mm. The total track length TTL of the imaging lens assembly=4.99 mm. The half ImgH of the diagonal length of the effective pixel area on the image plane S17=3.41 mm.

Figure 6A:
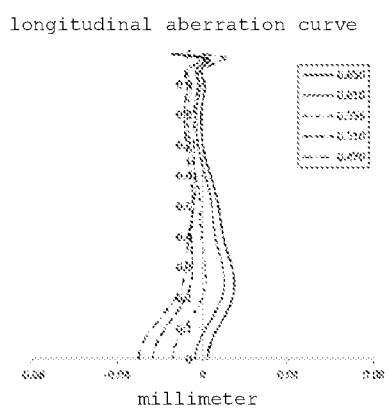
FIGS. 6A-6D respectively illustrate a longitudinal aberration curve, an astigmatic curve, a distortion curve and a lateral color curve of the optical imaging lens assembly according to Embodiment 3.
Figure 6B:
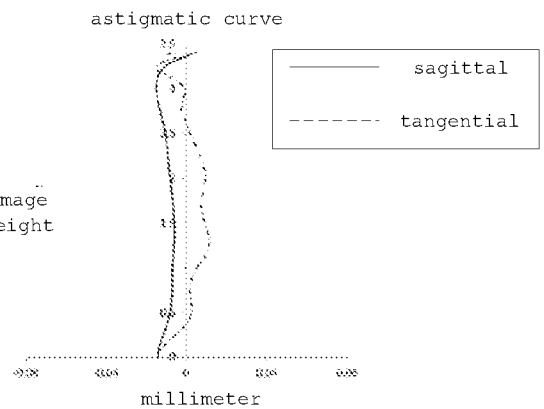
Figures 6C, 6D:
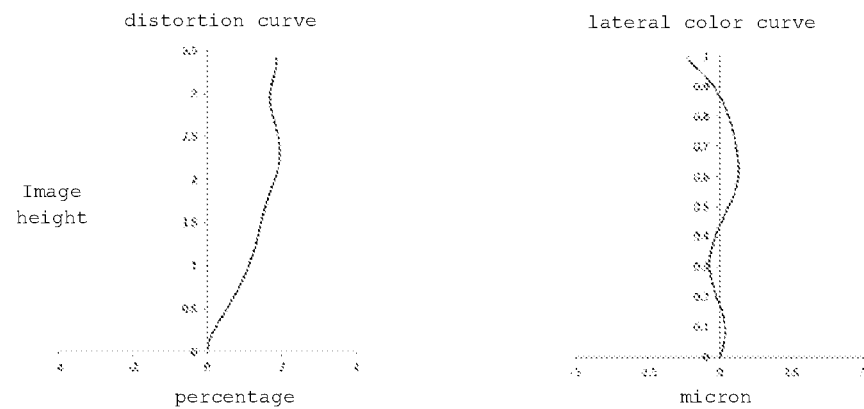

FIG. 6A shows the longitudinal aberration curve of the optical imaging lens assembly according to Embodiment 3, representing deviations of focal points where lights of different wavelengths converge after passing through the lens assembly. FIG. 6B shows the astigmatic curve of the optical imaging lens assembly according to Embodiment 3, representing a curvature of the tangential image plane and a curvature of the sagittal image plane. FIG. 6C shows the distortion curve of the optical imaging lens assembly according to Embodiment 3, representing degrees of distortion at different viewing angles. FIG. 6D shows the lateral color curve of the optical imaging lens assembly according to Embodiment 3, representing deviations of different heights of images on the image plane formed by light passing through the lens assembly. As can be seen according to FIGS. 6A to 6D, the optical imaging lens assembly according to Embodiment 3 can achieve good imaging quality.

Embodiment 4

Figure 7:
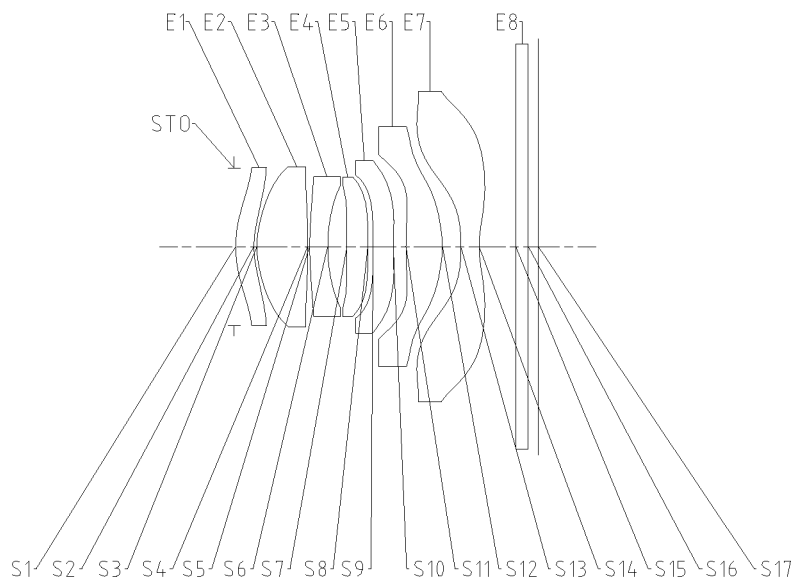
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a concave surface, and an image-side surface S8 of the fourth lens E4 is a concave surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 7 shows the surface type, the radius of curvature, the thickness, the material and the conic coefficient of each lens of the optical imaging lens assembly in Embodiment 4. The units of the radius of curvature and the thickness are both millimeters (mm).

TABLE 7

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | 0.0300 | | | |
| S1 | aspheric | 1.9300 | 0.3000 | 1.54 | 55.7 | −0.9100 |
| S2 | aspheric | 1.5900 | 0.0493 | | | −7.9886 |
| S3 | aspheric | 1.5535 | 0.8392 | 1.55 | 64.1 | −1.3847 |
| S4 | aspheric | −58.0862 | 0.0300 | | | 99.0000 |
| S5 | aspheric | 5.0853 | 0.3000 | 1.67 | 20.4 | 3.0126 |
| S6 | aspheric | 2.5902 | 0.3160 | | | −0.0040 |
| S7 | aspheric | −39144.5613 | 0.3434 | 1.55 | 64.1 | −99.0000 |
| S8 | aspheric | 99.6026 | 0.0861 | | | −99.0000 |
| S9 | aspheric | 20.9056 | 0.3386 | 1.67 | 20.4 | 99.0000 |
| S10 | aspheric | 12.5612 | 0.2067 | | | 55.1789 |
| S11 | aspheric | 8.7234 | 0.5996 | 1.55 | 64.1 | 9.9915 |
| S12 | aspheric | −1.7285 | 0.3055 | | | −6.6261 |
| S13 | aspheric | −3.0414 | 0.3000 | 1.54 | 55.7 | −1.4185 |
| S14 | aspheric | 1.7795 | 0.6041 | | | −6.4455 |
| S15 | spherical | infinite | 0.2100 | 1.52 | 64.2 | |
| S16 | spherical | infinite | 0.1626 | | | |
| S17 | spherical | infinite | | | | |

As can be obtained from Table 7, in Embodiment 4, the object-side surface and the image-side surface of each one of the first lens E1 to the seventh lens E7 are aspheric surfaces. Table 8 shows the high-order coefficients of the aspheric surfaces applicable in Embodiment 4. Here, the surface types of the aspheric surfaces may be defined by the formula (1) given in the above Embodiment 1.

TABLE 8

| surface number | A4 | A6 | A8 | A10 | A12 | A14 | A16 | A18 | A20 |
|---|---|---|---|---|---|---|---|---|---|
| S1 | −4.6168E−02 | 1.8024E−02 | −1.0344E−01 | 2.4222E−01 | −3.9202E−01 | 3.9199E−01 | −2.2759E−01 | 7.0602E−02 | −9.0891E−03 |
| S2 | 3.6539E−02 | −2.7933E−01 | 3.9169E−01 | −3.6760E−01 | 3.2052E−01 | −2.2394E−01 | 9.6608E−02 | −2.1283E−02 | 1.6825E−03 |
| S3 | −8.9458E−02 | 1.9309E−02 | −7.2209E−02 | 2.7414E−01 | −3.1397E−01 | 2.0295E−01 | −9.2847E−02 | 2.9710E−02 | −4.6057E−03 |
| S4 | −9.6279E−02 | 2.0207E−01 | −4.0077E−01 | 5.5805E−01 | −4.4455E−01 | 1.7978E−01 | −2.3048E−02 | −3.1382E−03 | 5.6909E−05 |
| S5 | −1.2560E−01 | 2.1811E−01 | −4.4838E−01 | 7.4715E−01 | −7.7012E−01 | 4.6044E−01 | −1.5476E−01 | 2.9638E−02 | −3.7639E−03 |
| S6 | −3.0435E−02 | 3.5316E−02 | −4.5945E−02 | 2.4644E−01 | −7.1155E−01 | 1.2193E+00 | −1.2171E+00 | 6.5182E−01 | −1.4344E−01 |
| S7 | −5.6803E−02 | 6.5976E−02 | −2.7165E−01 | 3.8263E−01 | −3.9366E−02 | −7.4284E−01 | 1.1684E+00 | −7.5859E−01 | 1.8879E−01 |
| S8 | −1.9005E−01 | 3.3524E−01 | −1.1080E+00 | 2.8446E+00 | −5.1424E+00 | 5.6319E+00 | −3.5065E+00 | 1.1367E+00 | −1.4756E−01 |
| S9 | −2.5361E−01 | 4.5207E−01 | −1.6594E+00 | 4.9412E+00 | −9.1864E+00 | 1.0078E+01 | −6.4178E+00 | 2.2132E+00 | −3.2379E−01 |
| S10 | −1.4686E−01 | −3.7870E−02 | −8.7226E−02 | 7.5466E−01 | −1.4122E+00 | 1.2997E+00 | −6.5853E−01 | 1.7639E−01 | −1.9530E−02 |
| S11 | −2.7526E−01 | 1.6146E−01 | 3.6704E−02 | −9.5536E−02 | 4.2590E−02 | −6.0208E−03 | 0.0000E+00 | 0.0000E+00 | 0.0000E+00 |
| S12 | 1.2133E−01 | −2.3752E−01 | 8.8297E−02 | 3.9345E−02 | −3.8440E−02 | 1.1556E−02 | −1.5504E−03 | 7.1095E−05 | 1.3790E−06 |
| S13 | −8.6217E−02 | −1.9336E−01 | 2.5886E−01 | −1.3232E−01 | 3.7655E−02 | −6.4998E−03 | 6.7801E−04 | −3.9303E−05 | 9.6765E−07 |
| S14 | −2.1139E−01 | 1.4779E−01 | −7.1994E−02 | 2.6006E−02 | −7.1171E−03 | 1.4036E−03 | −1.8425E−04 | 1.4184E−05 | −4.7780E−07 |

In Embodiment 4, the total effective focal length f of the optical imaging lens assembly=4.09 mm; the effective focal length f1 of the first lens E1=−24.31 mm; the effective focal length f2 of the second lens E2=2.79 mm; the effective focal length f3 of the third lens E3=−8.33 mm; the effective focal length f4 of the fourth lens E4=−181.98 mm; the effective focal length f5 of the fifth lens E5=−48.05 mm; the effective focal length f6 of the sixth lens E6=2.70 mm; the effective focal length f7 of the seventh lens E7=−2.05 mm. The total track length TTL of the imaging lens assembly=4.99 mm. The half ImgH of the diagonal length of the effective pixel area on the image plane S17=3.41 mm.

Figure 8A:
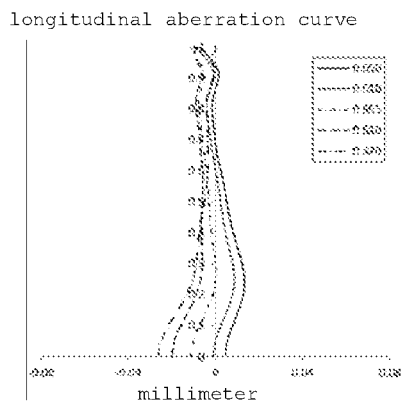
FIGS. 8A-8D respectively illustrate a longitudinal aberration curve, an astigmatic curve, a distortion curve and a lateral color curve of the optical imaging lens assembly according to Embodiment 4.
Figure 8B:
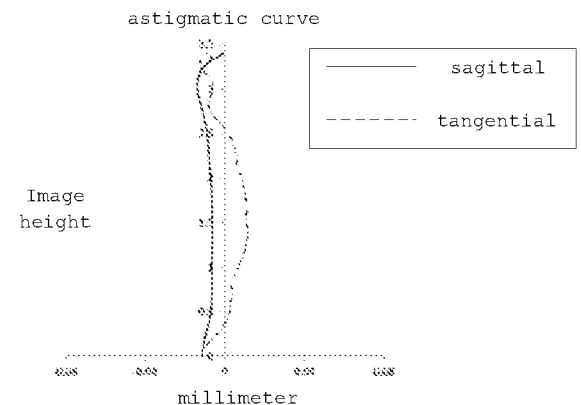
Figure 8C:
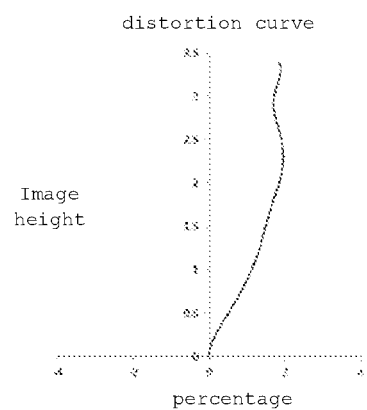
Figure 8D:
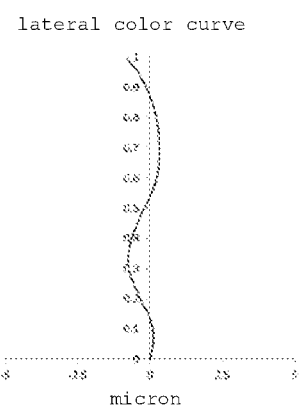

FIG. 8A shows the longitudinal aberration curve of the optical imaging lens assembly according to Embodiment 4, representing deviations of focal points where lights of different wavelengths converge after passing through the lens assembly. FIG. 8B shows the astigmatic curve of the optical imaging lens assembly according to Embodiment 4, representing a curvature of the tangential image plane and a curvature of the sagittal image plane. FIG. 8C shows the distortion curve of the optical imaging lens assembly according to Embodiment 4, representing degrees of distortion at different viewing angles. FIG. 8D shows the lateral color curve of the optical imaging lens assembly according to Embodiment 4, representing deviations of different heights of images on the image plane formed by light passing through the lens assembly. As can be seen according to FIGS. 8A to 8D, the optical imaging lens assembly according to Embodiment 4 can achieve good imaging quality.

Embodiment 5

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 9 shows the surface type, the radius of curvature, the thickness, the material and the conic coefficient of each lens of the optical imaging lens assembly in Embodiment 5. The units of the radius of curvature and the thickness are both millimeters (mm).

TABLE 9

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | 0.0300 | | | |
| S1 | aspheric | 1.9413 | 0.3000 | 1.54 | 55.7 | −0.7728 |
| S2 | aspheric | 1.5773 | 0.0336 | | | −7.6844 |
| S3 | aspheric | 1.5101 | 0.7769 | 1.55 | 64.1 | −1.3461 |
| S4 | aspheric | 64.3381 | 0.0300 | | | −99.0000 |
| S5 | aspheric | 4.8509 | 0.3000 | 1.67 | 20.4 | 3.7705 |
| S6 | aspheric | 2.5892 | 0.3084 | | | −0.7096 |
| S7 | aspheric | 20.0036 | 0.4780 | 1.55 | 64.1 | 79.4161 |
| S8 | aspheric | −27.8152 | 0.1150 | | | −99.0000 |
| S9 | aspheric | −100.0000 | 0.3000 | 1.67 | 20.4 | −99.0000 |
| S10 | aspheric | 12.4616 | 0.1910 | | | 69.9474 |
| S11 | aspheric | 11.2963 | 0.5751 | 1.55 | 64.1 | 11.3739 |
| S12 | aspheric | −1.7377 | 0.3080 | | | −6.9482 |
| S13 | aspheric | −3.1052 | 0.3000 | 1.54 | 55.7 | −1.3657 |
| S14 | aspheric | 1.7683 | 0.6032 | | | −6.5871 |
| S15 | spherical | infinite | 0.2100 | 1.52 | 64.2 | |
| S16 | spherical | infinite | 0.1618 | | | |
| S17 | spherical | infinite | | | | |

As can be obtained from Table 9, in Embodiment 5, the object-side surface and the image-side surface of each one of the first lens E1 to the seventh lens E7 are aspheric surfaces. Table 10 shows the high-order coefficients of the aspheric surfaces applicable in Embodiment 5. Here, the surface types of the aspheric surfaces may be defined by the formula (1) given in the above Embodiment 1.

TABLE 10

| surface number | A4 | A6 | A8 | A10 | A12 | A14 | A16 | A18 | A20 |
|---|---|---|---|---|---|---|---|---|---|
| S1 | −4.4162E−02 | 5.7748E−02 | −2.4885E−01 | 4.9957E−01 | −6.4202E−01 | 5.2015E−01 | −2.5348E−01 | 6.7878E−02 | −7.7092E−03 |
| S2 | 3.1822E−02 | −1.2643E−01 | −3.8412E−01 | 1.5517E+00 | −2.3968E+00 | 2.0884E+00 | −1.0744E+00 | 3.0463E−01 | −3.6778E−02 |
| S3 | −1.0092E−01 | 1.7283E−01 | −8.2740E−01 | 2.1835E+00 | −3.1118E+00 | 2.6894E+00 | −1.4212E+00 | 4.2429E−01 | −5.4970E−02 |
| S4 | −1.3303E−01 | 3.1426E−01 | −3.5320E−01 | −1.6224E−01 | 1.1118E+00 | −1.5809E+00 | 1.1356E+00 | −4.2156E−01 | 6.3694E−02 |
| S5 | −1.9378E−01 | 4.5734E−01 | −9.4444E−01 | 1.5631E+00 | −1.8658E+00 | 1.5004E+00 | −7.5144E−01 | 2.0768E−01 | −2.4379E−02 |
| S6 | −5.5010E−02 | 4.9491E−02 | 1.8831E−01 | −8.1543E−01 | 1.7690E+00 | −2.2744E+00 | 1.7307E+00 | −7.0780E−01 | 1.1902E−01 |
| S7 | −1.0998E−01 | 5.6640E−01 | −2.8299E+00 | 8.3504E+00 | −1.5600E+01 | 1.8526E+01 | −1.3541E+01 | 5.5565E+00 | −9.7696E−01 |
| S8 | −1.4328E−01 | 2.9213E−01 | −8.5159E−01 | 1.6030E+00 | −2.2493E+00 | 2.1366E+00 | −1.2245E+00 | 3.6966E−01 | −4.2720E−02 |
| S9 | −2.2545E−01 | 3.3890E−01 | −7.8969E−01 | 1.6158E+00 | −2.5010E+00 | 2.4475E+00 | −1.3812E+00 | 4.0233E−01 | −4.5924E−02 |
| S10 | −1.8905E−01 | 1.0995E−01 | −3.4507E−01 | 9.4376E−01 | −1.4310E+00 | 1.2532E+00 | −6.3756E−01 | 1.7504E−01 | −2.0005E−02 |
| S11 | 2.5686E−02 | −2.2545E−01 | 5.2454E−02 | 2.1450E−01 | −3.1933E−01 | 2.2434E−01 | −9.3510E−02 | 2.2816E−02 | −2.4758E−03 |
| S12 | 1.2492E−01 | −2.8009E−01 | 1.8577E−01 | −6.5892E−02 | 2.6217E−02 | −1.2303E−02 | 3.6861E−03 | −5.5931E−04 | 3.3436E−05 |
| S13 | −7.6268E−02 | −2.3763E−01 | 3.1601E−01 | −1.6853E−01 | 5.0940E−02 | −9.4819E−03 | 1.0843E−03 | −7.0289E−05 | 1.9853E−06 |
| S14 | −2.1029E−01 | 1.4507E−01 | −7.4013E−02 | 2.9432E−02 | −8.9373E−03 | 1.9103E−03 | −2.6344E−04 | 2.0753E−05 | −7.0265E−07 |

In Embodiment 5, the total effective focal length f of the optical imaging lens assembly=4.10 mm; the effective focal length f1 of the first lens E1=−22.01 mm; the effective focal length f2 of the second lens E2=2.82 mm; the effective focal length f3 of the third lens E3=−8.81 mm; the effective focal length f4 of the fourth lens E4=21.39 mm; the effective focal length f5 of the fifth lens E5=−16.63 mm; the effective focal length f6 of the sixth lens E6=2.80 mm; the effective focal length f7 of the seventh lens E7=−2.06 mm. The total track length TTL of the imaging lens assembly=4.99 mm. The half ImgH of the diagonal length of the effective pixel area on the image plane S17=3.48 mm.

Figures 10C, 10D:
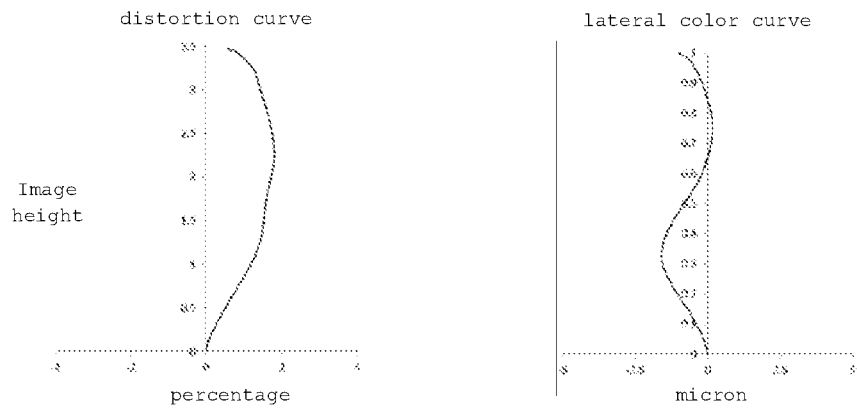

FIG. 10A shows the longitudinal aberration curve of the optical imaging lens assembly according to Embodiment 5, representing deviations of focal points where lights of different wavelengths converge after passing through the lens assembly. FIG. 10B shows the astigmatic curve of the optical imaging lens assembly according to Embodiment 5, representing a curvature of the tangential image plane and a curvature of the sagittal image plane. FIG. 10C shows the distortion curve of the optical imaging lens assembly according to Embodiment 5, representing degrees of distortion at different viewing angles. FIG. 10D shows the lateral color curve of the optical imaging lens assembly according to Embodiment 5, representing deviations of different heights of images on the image plane formed by light passing through the lens assembly. As can be seen according to FIGS. 10A to 10D, the optical imaging lens assembly according to Embodiment 5 can achieve good imaging quality.

Embodiment 6

Figure 11:
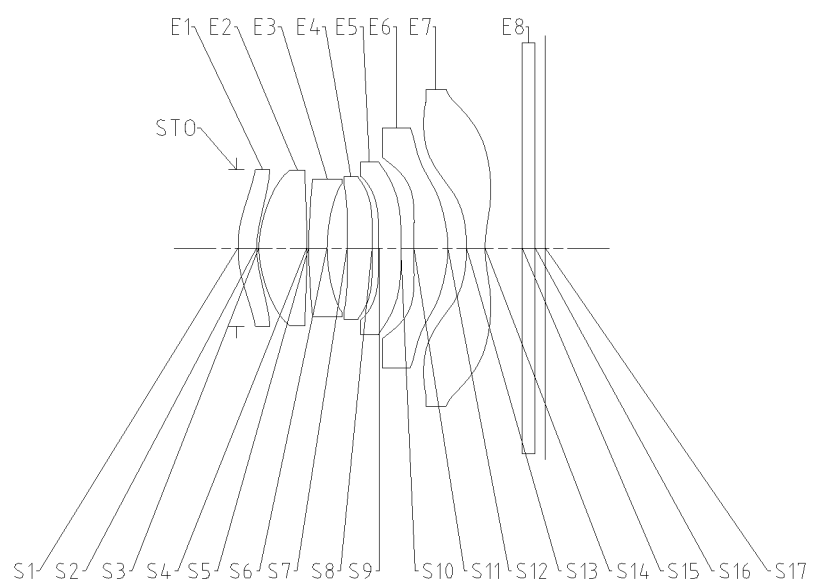
FIG. 11 is a schematic structural diagram illustrating an optical imaging lens assembly according to Embodiment 6 of the present disclosure.

An optical imaging lens assembly according to embodiment 6 of the present disclosure is described below with reference to FIGS. 11-12D. FIG. 11 is a schematic structural diagram illustrating the optical imaging lens assembly according to embodiment 6 of the present disclosure.

As shown in FIG. 11, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 11 shows the surface type, the radius of curvature, the thickness, the material and the conic coefficient of each lens of the optical imaging lens assembly in embodiment 6. The units of the radius of curvature and the thickness are both millimeters (mm).

TABLE 11

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | 0.0261 | | | |
| S1 | aspheric | 1.9432 | 0.3022 | 1.54 | 55.7 | −0.7492 |
| S2 | aspheric | 1.5794 | 0.0361 | | | −7.6514 |
| S3 | aspheric | 1.5052 | 0.7803 | 1.55 | 64.1 | −1.3487 |
| S4 | aspheric | 169.7381 | 0.0301 | | | −70.2982 |
| S5 | aspheric | 4.9654 | 0.2985 | 1.67 | 20.4 | 3.6871 |
| S6 | aspheric | 2.5435 | 0.3270 | | | −0.6175 |
| S7 | aspheric | 24.9739 | 0.4061 | 1.55 | 64.1 | −87.1178 |
| S8 | aspheric | 40.0343 | 0.1097 | | | −45.0175 |
| S9 | aspheric | 126.2881 | 0.3575 | 1.67 | 20.4 | 59.2980 |
| S10 | aspheric | −380.0393 | 0.2104 | | | 20.6452 |
| S11 | aspheric | 21.0474 | 0.5537 | 1.55 | 64.1 | 28.1486 |
| S12 | aspheric | −1.7459 | 0.3008 | | | −6.8832 |
| S13 | aspheric | −3.2287 | 0.3000 | 1.54 | 55.7 | −1.2940 |
| S14 | aspheric | 1.7474 | 0.6050 | | | −6.7017 |
| S15 | spherical | infinite | 0.2100 | 1.52 | 64.2 | |
| S16 | spherical | infinite | 0.1636 | | | |
| S17 | spherical | infinite | | | | |

As can be obtained from Table 11, in embodiment 6, the object-side surface and the image-side surface of each one of the first lens E1 to the seventh lens E7 are aspheric surfaces. Table 12 shows the high-order coefficients of the aspheric surfaces applicable in embodiment 6. Here, the surface types of the aspheric surfaces may be defined by the formula (1) given in the above Embodiment 1.

TABLE 12

| surface number | A4 | A6 | A8 | A10 | A12 | A14 | A16 | A18 | A20 |
|---|---|---|---|---|---|---|---|---|---|
| S1 | −4.2889E−02 | 4.7161E−02 | −1.9335E−01 | 3.5643E−01 | −4.2013E−01 | 3.0922E−01 | −1.3398E−01 | 3.0751E−02 | −2.8264E−03 |
| S2 | 3.3826E−02 | −1.8203E−01 | −9.8136E−02 | 8.8128E−01 | −1.4946E+00 | 1.3443E+00 | −7.0217E−01 | 2.0058E−01 | −2.4272E−02 |
| S3 | −9.6313E−02 | 1.0493E−01 | −5.1224E−01 | 1.4508E+00 | −2.1143E+00 | 1.8498E+00 | −9.8913E−01 | 2.9939E−01 | −3.9432E−02 |
| S4 | −1.5348E−01 | 5.0151E−01 | −1.1861E+00 | 1.9295E+00 | −2.0631E+00 | 1.3909E+00 | −5.3817E−01 | 9.7306E−02 | −4.1887E−03 |
| S5 | −2.1002E−01 | 5.8987E−01 | −1.4790E+00 | 2.8072E+00 | −3.6360E+00 | 3.0546E+00 | −1.5638E+00 | 4.3496E−01 | −4.9704E−02 |
| S6 | −5.9768E−02 | 7.8530E−02 | 1.1554E−01 | −7.4078E−01 | 1.8569E+00 | −2.6441E+00 | 2.1996E+00 | −9.8450E−01 | 1.8260E−01 |
| S7 | −8.8565E−02 | 3.3229E−01 | −1.7354E+00 | 5.2165E+00 | −9.8748E+00 | 1.1873E+01 | −8.8072E+00 | 3.6846E+00 | −6.6288E−01 |
| S8 | −1.9625E−01 | 5.2673E−01 | −2.1109E+00 | 5.3058E+00 | −8.6489E+00 | 8.9047E+00 | −5.5457E+00 | 1.9006E+00 | −2.7351E−01 |
| S9 | −2.4885E−01 | 5.5945E−01 | −1.9703E+00 | 4.7594E+00 | −7.3882E+00 | 7.1497E+00 | −4.1559E+00 | 1.3251E+00 | −1.7839E−01 |
| S10 | −1.4935E−01 | 5.2049E−02 | −2.0983E−01 | 6.6192E−01 | −1.0026E+00 | 8.5151E−01 | −4.1939E−01 | 1.1200E−01 | −1.2508E−02 |
| S11 | 1.9567E−02 | −1.9625E−01 | 6.8001E−02 | 1.0313E−01 | −1.4513E−01 | 8.5535E−02 | −3.1146E−02 | 7.5521E−03 | −8.9247E−04 |
| S12 | 1.1604E−01 | −2.5499E−01 | 1.4976E−01 | −3.4145E−02 | 7.6047E−03 | −5.2307E−03 | 2.0416E−03 | −3.4808E−04 | 2.1976E−05 |
| S13 | −7.2645E−02 | −2.4346E−01 | 3.2011E−01 | −1.7011E−01 | 5.1237E−02 | −9.4885E−03 | 1.0769E−03 | −6.9073E−05 | 1.9247E−06 |
| S14 | −1.9727E−01 | 1.2241E−01 | −5.3670E−02 | 1.8386E−02 | −5.0486E−03 | 1.0186E−03 | −1.3555E−04 | 1.0403E−05 | −3.4440E−07 |

In embodiment 6, the total effective focal length f of the optical imaging lens assembly=4.10 mm; the effective focal length f1 of the first lens E1=−22.15 mm; the effective focal length f2 of the second lens E2=2.78 mm; the effective focal length f3 of the third lens E3=−8.24 mm; the effective focal length f4 of the fourth lens E4=120.45 mm; the effective focal length f5 of the fifth lens E5=142.42 mm; the effective focal length f6 of the sixth lens E6=2.98 mm; the effective focal length f7 of the seventh lens E7=−2.07 mm. The total track length TTL of the imaging lens assembly=4.99 mm. The half ImgH of the diagonal length of the effective pixel area on the image plane S17=3.49 mm.

Figure 12A:
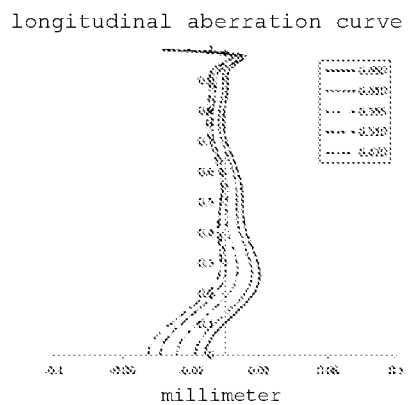
FIGS. 12A-12D respectively illustrate a longitudinal aberration curve, an astigmatic curve, a distortion curve and a lateral color curve of the optical imaging lens assembly according to Embodiment 6.
Figure 12B:
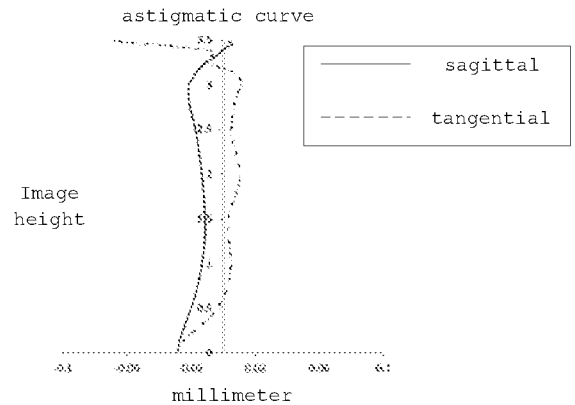
Figure 12C:
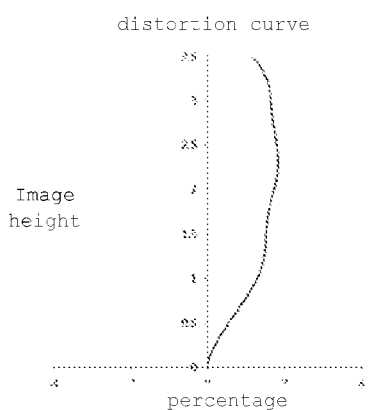
Figure 12D:
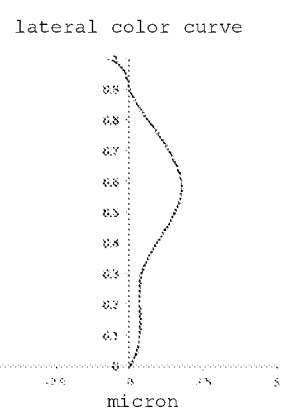

FIG. 12A shows the longitudinal aberration curve of the optical imaging lens assembly according to embodiment 6, representing deviations of focal points where lights of different wavelengths converge after passing through the lens assembly. FIG. 12B shows the astigmatic curve of the optical imaging lens assembly according to embodiment 6, representing a curvature of the tangential image plane and a curvature of the sagittal image plane. FIG. 12C shows the distortion curve of the optical imaging lens assembly according to embodiment 6, representing degrees of distortion at different viewing angles. FIG. 12D shows the lateral color curve of the optical imaging lens assembly according to embodiment 6, representing deviations of different heights of images on the image plane formed by light passing through the lens assembly. As can be seen according to FIGS. 12A to 12D, the optical imaging lens assembly according to embodiment 6 can achieve good imaging quality.

Embodiment 7

Figure 13:
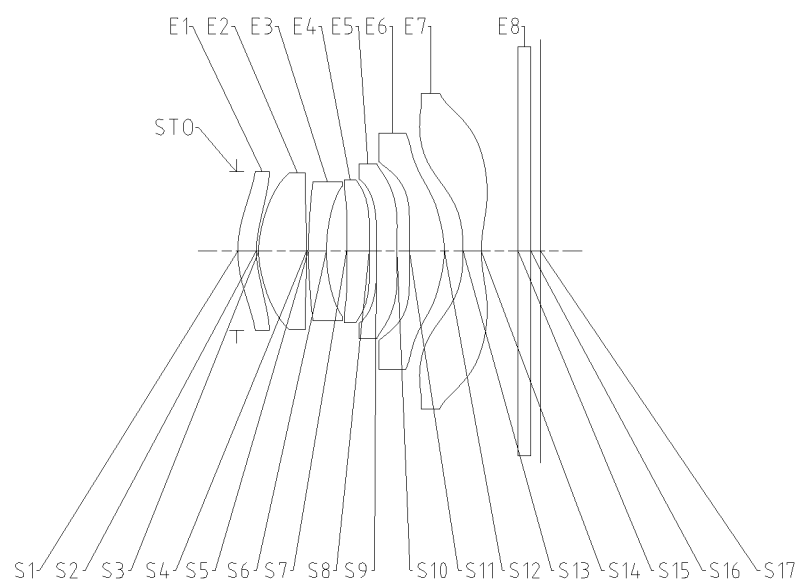
FIG. 13 is a schematic structural diagram illustrating an optical imaging lens assembly according to Embodiment 7 of the present disclosure.

An optical imaging lens assembly according to embodiment 7 of the present disclosure is described below with reference to FIGS. 13-14D. FIG. 13 is a schematic structural diagram illustrating the optical imaging lens assembly according to embodiment 7 of the present disclosure.

As shown in FIG. 13, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 13 shows the surface type, the radius of curvature, the thickness, the material and the conic coefficient of each lens of the optical imaging lens assembly in embodiment 7. The units of the radius of curvature and the thickness are both millimeters (mm).

TABLE 13

| surface number | surface type | radius of curvature | thickness | refractive index | abbe number | conic coefficient |
|---|---|---|---|---|---|---|
| OBJ | spherical | infinite | infinite | | | |
| STO | spherical | infinite | 0.0300 | | | |
| S1 | aspheric | 1.9373 | 0.3008 | 1.54 | 55.7 | −0.7616 |
| S2 | aspheric | 1.5793 | 0.0395 | | | −7.6786 |
| S3 | aspheric | 1.5083 | 0.7890 | 1.55 | 64.1 | −1.3567 |
| S4 | aspheric | 102.8755 | 0.0300 | | | −99.0000 |
| S5 | aspheric | 4.7700 | 0.3000 | 1.67 | 20.4 | 3.4292 |
| S6 | aspheric | 2.4924 | 0.3327 | | | −0.5073 |
| S7 | aspheric | 19.0679 | 0.3735 | 1.55 | 64.1 | 19.4102 |
| S8 | aspheric | 18.3482 | 0.1148 | | | −99.0000 |
| S9 | aspheric | 12.4635 | 0.3429 | 1.67 | 20.4 | −53.2693 |
| S10 | aspheric | 13.2003 | 0.2030 | | | 69.1594 |
| S11 | aspheric | −2593.5616 | 0.5779 | 1.55 | 64.1 | −99.0000 |
| S12 | aspheric | −1.5205 | 0.3082 | | | −6.6174 |
| S13 | aspheric | −3.1883 | 0.3000 | 1.54 | 55.7 | −1.3112 |
| S14 | aspheric | 1.6708 | 0.6052 | | | −7.1013 |
| S15 | spherical | infinite | 0.2100 | 1.52 | 64.2 | |
| S16 | spherical | infinite | 0.1637 | | | |
| S17 | spherical | infinite | | | | |

As can be obtained from Table 13, in embodiment 7, the object-side surface and the image-side surface of each one of the first lens E1 to the seventh lens E7 are aspheric surfaces. Table 14 shows the high-order coefficients of the aspheric surfaces applicable in embodiment 7. Here, the surface types of the aspheric surfaces may be defined by the formula (1) given in the above Embodiment 1.

TABLE 14

| surface number | A4 | A6 | A8 | A10 | A12 | A14 | A16 | A18 | A20 |
|---|---|---|---|---|---|---|---|---|---|
| S1 | −4.1151E−02 | 2.7407E−02 | −1.3018E−01 | 2.4893E−01 | −3.1406E−01 | 2.4889E−01 | −1.1590E−01 | 2.8730E−02 | −2.9055E−03 |
| S2 | 3.7422E−02 | −2.3137E−01 | 1.2643E−01 | 3.5479E−01 | −7.7309E−01 | 7.4012E−01 | −3.9648E−01 | 1.1450E−01 | −1.3883E−02 |
| S3 | −9.2155E−02 | 6.2488E−02 | −3.2346E−01 | 1.0021E+00 | −1.4842E+00 | 1.3037E+00 | −6.9951E−01 | 2.1258E−01 | −2.8099E−02 |
| S4 | −1.5234E−01 | 5.0803E−01 | −1.2557E+00 | 2.1398E+00 | −2.3998E+00 | 1.7177E+00 | −7.3228E−01 | 1.6199E−01 | −1.3343E−02 |
| S5 | −1.9726E−01 | 5.1659E−01 | −1.1881E+00 | 2.0105E+00 | −2.2262E+00 | 1.4917E+00 | −5.1956E−01 | 5.0734E−02 | 1.0152E−02 |
| S6 | −5.3647E−02 | 6.7228E−02 | 9.1060E−02 | −5.4615E−01 | 1.3381E+00 | −1.8924E+00 | 1.5783E+00 | −7.1029E−01 | 1.3254E−01 |
| S7 | −8.0660E−02 | 2.9174E−01 | −1.4911E+00 | 4.3640E+00 | −8.0310E+00 | 9.3675E+00 | −6.7394E+00 | 2.7400E+00 | −4.8035E−01 |
| S8 | −1.9497E−01 | 4.1233E−01 | −1.3490E+00 | 2.8443E+00 | −3.9186E+00 | 3.3695E+00 | −1.7218E+00 | 4.7511E−01 | −5.3357E−02 |
| S9 | −2.6819E−01 | 5.2214E−01 | −1.7859E+00 | 4.2969E+00 | −6.5181E+00 | 6.1301E+00 | −3.5149E+00 | 1.1421E+00 | −1.6408E−01 |
| S10 | −1.5328E−01 | 1.0704E−01 | −5.7486E−01 | 1.4289E+00 | −1.8234E+00 | 1.3418E+00 | −5.8121E−01 | 1.3851E−01 | −1.4035E−02 |
| S11 | 7.0857E−02 | −1.8128E−01 | −1.6600E−01 | 4.9373E−01 | −4.6360E−01 | 2.3678E−01 | −7.7110E−02 | 1.6760E−02 | −1.8441E−03 |
| S12 | 9.3212E−02 | −1.6344E−01 | −1.3479E−02 | 1.2195E−01 | −7.8871E−02 | 2.3502E−02 | −3.6192E−03 | 2.6223E−04 | −5.7761E−06 |
| S13 | −6.6240E−02 | −2.4060E−01 | 3.0920E−01 | −1.6249E−01 | 4.8566E−02 | −8.9397E−03 | 1.0095E−03 | −6.4473E−05 | 1.7894E−06 |
| S14 | −2.0541E−01 | 1.3559E−01 | −6.4999E−02 | 2.4052E−02 | −6.8083E−03 | 1.3652E−03 | −1.7805E−04 | 1.3382E−05 | −4.3563E−07 |

In embodiment 7, the total effective focal length f of the optical imaging lens assembly=4.14 mm; the effective focal length f1 of the first lens E1=−22.54 mm; the effective focal length f2 of the second lens E2=2.80 mm; the effective focal length f3 of the third lens E3=−8.28 mm; the effective focal length f4 of the fourth lens E4=−1090.27 mm; the effective focal length f5 of the fifth lens E5=282.81 mm; the effective focal length f6 of the sixth lens E6=2.79 mm; the effective focal length f7 of the seventh lens E7=−2.00 mm. The total track length TTL of the imaging lens assembly=4.99 mm. The half ImgH of the diagonal length of the effective pixel area on the image plane S17=3.48 mm.

Figure 14A:
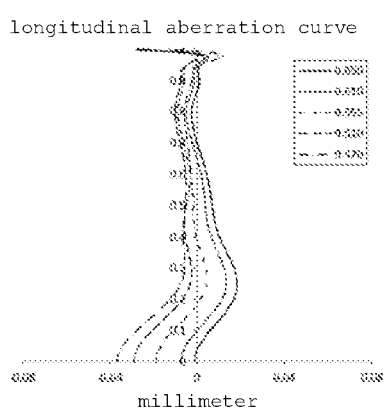
FIGS. 14A-14D respectively illustrate a longitudinal aberration curve, an astigmatic curve, a distortion curve and a lateral color curve of the optical imaging lens assembly according to Embodiment 7.
Figure 14B:
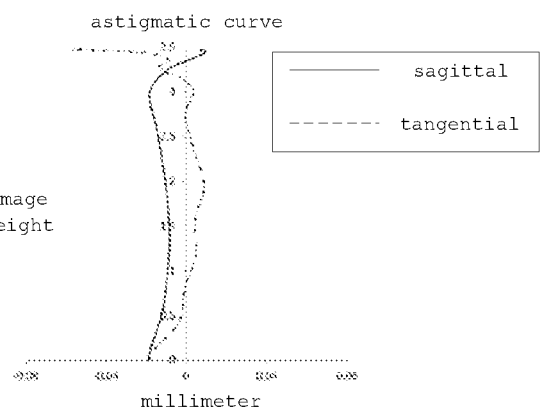
Figures 14C, 14D:
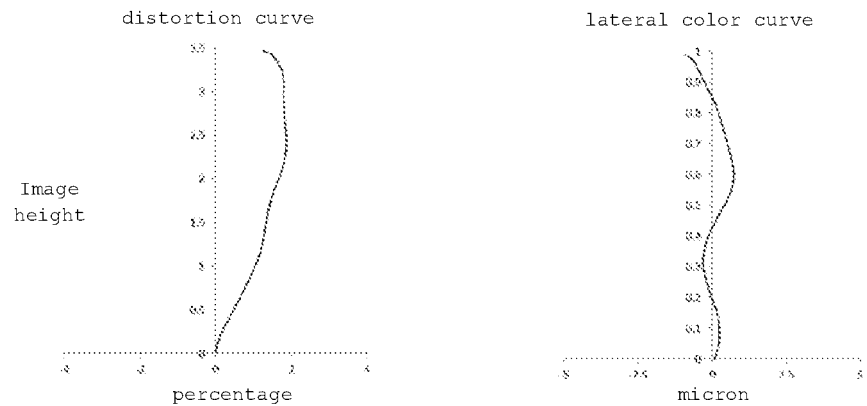

FIG. 14A shows the longitudinal aberration curve of the optical imaging lens assembly according to embodiment 7, representing deviations of focal points where lights of different wavelengths converge after passing through the lens assembly. FIG. 14B shows the astigmatic curve of the optical imaging lens assembly according to embodiment 7, representing a curvature of the tangential image plane and a curvature of the sagittal image plane. FIG. 14C shows the distortion curve of the optical imaging lens assembly according to embodiment 7, representing degrees of distortion at different viewing angles. FIG. 14D shows the lateral color curve of the optical imaging lens assembly according to embodiment 7, representing deviations of different heights of images on the image plane formed by light passing through the lens assembly. As can be seen according to FIGS. 14A to 14D, the optical imaging lens assembly according to embodiment 7 can achieve good imaging quality.

Embodiment 8

Figure 15:
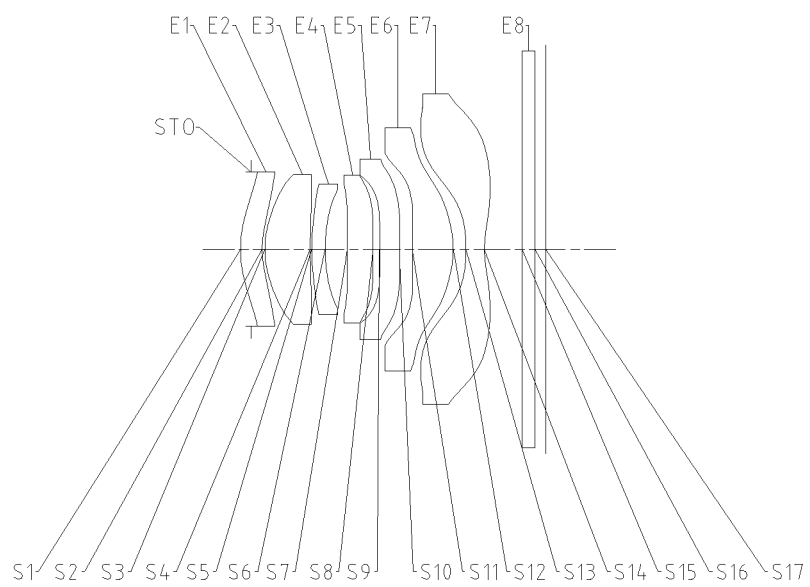
FIG. 15 is a schematic structural diagram illustrating an optical imaging lens assembly according to Embodiment 8 of the present disclosure.

An optical imaging lens assembly according to embodiment 8 of the present disclosure is described below with reference to FIGS. 15-16D. FIG. 15 is a schematic structural diagram illustrating the optical imaging lens assembly according to embodiment 8 of the present disclosure.

As shown in FIG. 15, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 15 shows the surface type, the radius of curvature, the thickness, the material and the conic coefficient of each lens of the optical imaging lens assembly in embodiment 8. The units of the radius of curvature and the thickness are both millimeters (mm).

TABLE 15

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1706 | | | |
| S1 | aspheric | 1.9870 | 0.3509 | 1.54 | 55.7 | −0.6919 |
| S2 | aspheric | 1.6088 | 0.0436 | | | −8.0922 |

TABLE 15-continued

| surface number | surface type | radius of curvature | thickness | material refractive index | material abbe number | conic coefficient |
|---|---|---|---|---|---|---|
| S3 | aspheric | 1.4421 | 0.7389 | 1.55 | 64.1 | −1.3306 |
| S4 | aspheric | 4.6415 | 0.0250 | | | −98.6901 |
| S5 | aspheric | 2.7164 | 0.2200 | 1.67 | 20.4 | 0.6328 |
| S6 | aspheric | 2.6486 | 0.3626 | | | 0.2446 |
| S7 | aspheric | 27.1600 | 0.4190 | 1.55 | 64.1 | 75.5805 |
| S8 | aspheric | 16.9515 | 0.1049 | | | 94.0966 |
| S9 | aspheric | 11.9713 | 0.3237 | 1.67 | 20.4 | −42.8807 |
| S10 | aspheric | 13.1765 | 0.2121 | | | 74.7991 |
| S11 | aspheric | 17.7176 | 0.6683 | 1.55 | 64.1 | 97.8058 |
| S12 | aspheric | −1.5303 | 0.2033 | | | −4.6973 |
| S13 | aspheric | −2.8063 | 0.3000 | 1.54 | 55.7 | −1.5009 |
| S14 | aspheric | 1.7008 | 0.6162 | | | −7.4385 |
| S15 | spherical | infinite | 0.2100 | 1.52 | 64.2 | |
| S16 | spherical | infinite | 0.1748 | | | |
| S17 | spherical | infinite | | | | |

As can be obtained from Table 15, in embodiment 8, the object-side surface and the image-side surface of each one of the first lens E1 to the seventh lens E7 are aspheric surfaces. Table 16 shows the high-order coefficients of the aspheric surfaces applicable in embodiment 8. Here, the surface types of the aspheric surfaces may be defined by the formula (1) given in the above Embodiment 1.

TABLE 16

| surface number | A4 | A6 | A8 | A10 | A12 | A14 | A16 | A18 | A20 |
|---|---|---|---|---|---|---|---|---|---|
| S1 | −4.3851E−02 | 2.4308E−02 | −9.3954E−02 | 1.5825E−01 | −1.9274E−01 | 1.5963E−01 | −8.1162E−02 | 2.2772E−02 | −2.7159E−03 |
| S2 | −9.0807E−03 | −1.6499E−01 | 2.9365E−01 | −3.5015E−01 | 3.6199E−01 | −2.8783E−01 | 1.4996E−01 | −4.4254E−02 | 5.5432E−03 |
| S3 | −1.3231E−01 | 1.5382E−01 | −2.7004E−01 | 5.8934E−01 | −8.1559E−01 | 7.3230E−01 | −4.2235E−01 | 1.4189E−01 | −2.1070E−02 |
| S4 | −2.0954E−01 | 5.5538E−01 | −9.0651E−01 | 8.7838E−01 | −4.4566E−01 | 6.0552E−02 | 4.0697E−02 | −1.5090E−02 | 3.2582E−04 |
| S5 | −3.3839E−01 | 6.5536E−01 | −7.4195E−01 | 5.5488E−02 | 1.2476E+00 | −1.9759E+00 | 1.5019E+00 | −5.9358E−01 | 9.7701E−02 |
| S6 | −3.1617E−02 | −1.4859E−01 | 1.2218E+00 | −3.8295E+00 | 7.2965E+00 | −8.7909E+00 | 6.5648E+00 | −2.7676E+00 | 5.0453E−01 |
| S7 | −9.1614E−02 | 3.2990E−01 | −1.7443E+00 | 5.7434E+00 | −1.2183E+01 | 1.6514E+01 | −1.3794E+01 | 6.4662E+00 | 1.2998E+00 |
| S8 | −1.7885E−01 | 2.8066E−01 | −9.9251E−01 | 2.5979E+00 | −4.6795E+00 | 5.3621E+00 | −3.7165E+00 | 1.4223E+00 | −2.3001E−01 |
| S9 | −2.3924E−01 | 4.3751E−01 | −1.4155E+00 | 3.3717E+00 | −5.3032E+00 | 5.1761E+00 | −3.0107E+00 | 9.5057E−01 | −1.2440E−01 |
| S10 | −1.7938E−01 | 1.9148E−01 | −4.6466E−01 | 9.3545E−01 | −1.1970E+00 | 9.3417E−01 | −4.3515E−01 | 1.1142E−01 | −1.2034E−02 |
| S11 | −3.6485E−02 | −7.9734E−02 | −1.7313E−01 | 8.8564E−02 | −8.6657E−02 | 3.3314E−02 | −4.4911E−03 | 0.0000E+00 | 0.0000E+00 |
| S12 | 1.1102E−01 | −2.8331E−01 | 2.2606E−01 | −1.1664E−01 | 5.6327E−02 | −2.1981E−02 | 5.3840E−03 | −7.0714E−04 | 3.8048E−05 |
| S13 | −1.0233E−01 | −1.7092E−01 | 2.3671E−01 | −1.1636E−01 | 3.0670E−02 | −4.6851E−03 | 4.0171E−04 | −1.6398E−05 | 1.6554E−07 |
| S14 | −2.0930E−01 | 1.5863E−01 | −8.7860E−02 | 3.6798E−02 | −1.1364E−02 | 2.4215E−03 | −3.3081E−04 | 2.5833E−05 | −8.7002E−07 |

In embodiment 8, the total effective focal length f of the optical imaging lens assembly=4.05 mm; the effective focal length f1 of the first lens E1=−23.29 mm; the effective focal length f2 of the second lens E2=3.54 mm; the effective focal length f3 of the third lens E3=537.79 mm; the effective focal length f4 of the fourth lens E4=−83.83 mm; the effective focal length f5 of the fifth lens E5=177.55 mm; the effective focal length f6 of the sixth lens E6=2.61 mm; the effective focal length f7 of the seventh lens E7=−1.93 mm. The total track length TTL of the imaging lens assembly=4.97 mm. The half ImgH of the diagonal length of the effective pixel area on the image plane S17=3.41 mm.

Figure 16A:
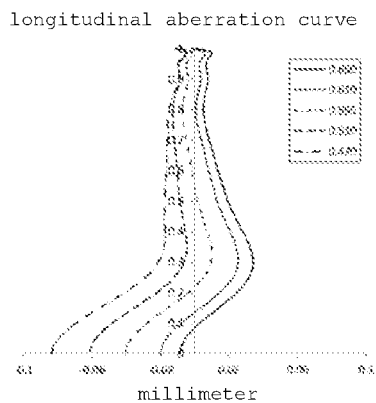
FIGS. 16A-16D respectively illustrate a longitudinal aberration curve, an astigmatic curve, a distortion curve and a lateral color curve of the optical imaging lens assembly according to Embodiment 8.
Figure 16B:
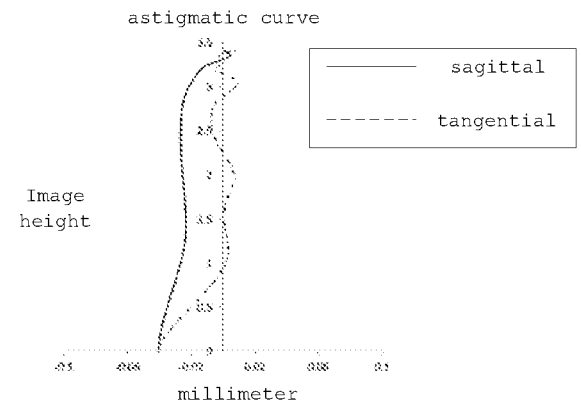
Figure 16C:
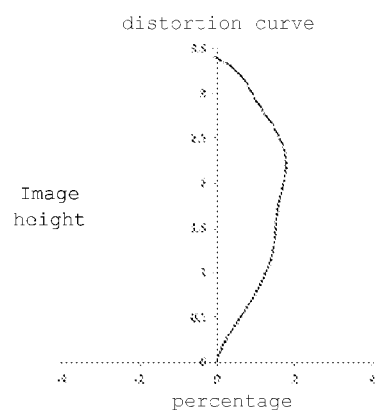
Figure 16D:
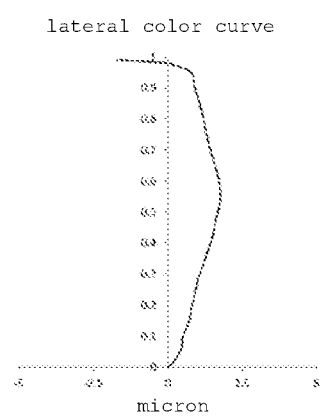

FIG. 16A shows the longitudinal aberration curve of the optical imaging lens assembly according to embodiment 8, representing deviations of focal points where lights of different wavelengths converge after passing through the lens assembly. FIG. 16B shows the astigmatic curve of the optical imaging lens assembly according to embodiment 8, representing a curvature of the tangential image plane and a curvature of the sagittal image plane. FIG. 16C shows the distortion curve of the optical imaging lens assembly according to embodiment 8, representing degrees of distortion at different viewing angles. FIG. 16D shows the lateral color curve of the optical imaging lens assembly according to embodiment 8, representing deviations of different heights of images on the image plane formed by light passing through the lens assembly. As can be seen according to FIGS. 16A to 16D, the optical imaging lens assembly according to embodiment 8 can achieve good imaging quality.

Embodiment 9

Figure 17:
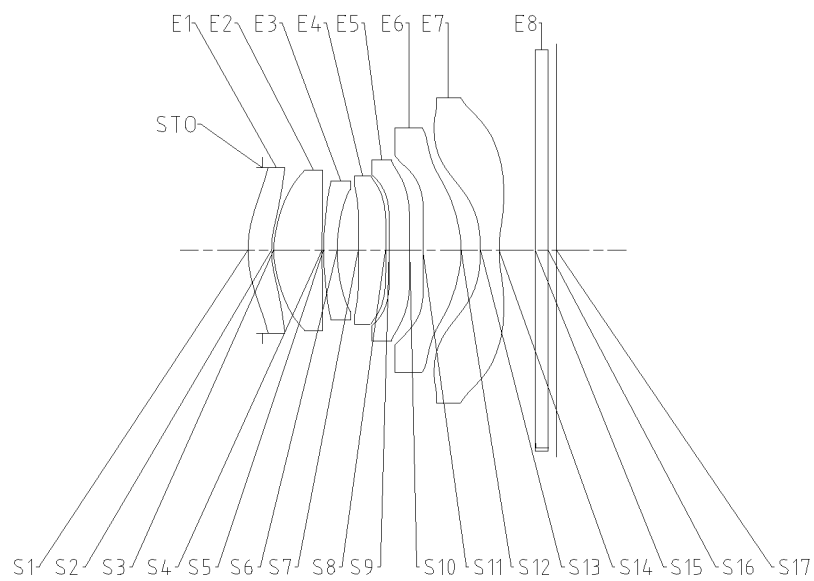
FIG. 17 is a schematic structural diagram illustrating an optical imaging lens assembly according to Embodiment 9 of the present disclosure.

An optical imaging lens assembly according to embodiment 9 of the present disclosure is described below with reference to FIGS. 17-18D. FIG. 17 is a schematic structural diagram illustrating the optical imaging lens assembly according to embodiment 9 of the present disclosure.

As shown in FIG. 17, the optical imaging lens assembly according to the exemplary implementations of the present disclosure along the optical axis from the object side to the image side sequentially includes: a diaphragm STO, a first lens E1, a second lens E2, a third lens E3, a fourth lens E4, a fifth lens E5, a sixth lens E6, a seventh lens E7, an optical filter E8 and an image plane S17.

The first lens E1 has a negative refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object passes through the surfaces S1 to S16 sequentially and is finally imaged on the image plane S17.

Table 17 shows the surface type, the radius of curvature, the thickness, the material and the conic coefficient of each lens of the optical imaging lens assembly in embodiment 9. The units of the radius of curvature and the thickness are both millimeters (mm).

TABLE 17

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.2319 | | | |
| S1 | aspheric | 1.9834 | 0.3813 | 1.54 | 55.7 | −0.5287 |
| S2 | aspheric | 1.6161 | 0.0333 | | | −8.0272 |
| S3 | aspheric | 1.4919 | 0.7831 | 1.55 | 64.1 | −1.5447 |
| S4 | aspheric | 15.2898 | 0.0250 | | | 12.3128 |
| S5 | aspheric | 3.9176 | 0.2200 | 1.67 | 20.4 | 3.4298 |
| S6 | aspheric | 2.5576 | 0.3417 | | | −0.4491 |
| S7 | aspheric | 27.9243 | 0.4388 | 1.55 | 64.1 | −88.0317 |
| S8 | aspheric | 13.0848 | 0.0632 | | | −49.4927 |
| S9 | aspheric | 10.0142 | 0.3298 | 1.67 | 20.4 | 29.6672 |
| S10 | aspheric | 14.4368 | 0.2103 | | | 89.7413 |
| S11 | aspheric | 14.3484 | 0.6193 | 1.55 | 64.1 | 47.7120 |
| S12 | aspheric | −1.7530 | 0.3131 | | | −5.9374 |
| S13 | aspheric | −2.7767 | 0.3000 | 1.54 | 55.7 | −1.5642 |
| S14 | aspheric | 2.0242 | 0.5818 | | | −6.1366 |
| S15 | spherical | infinite | 0.2100 | 1.52 | 64.2 | |
| S16 | spherical | infinite | 0.1403 | | | |
| S17 | spherical | infinite | | | | |

As can be obtained from Table 17, in embodiment 9, the object-side surface and the image-side surface of each one of the first lens E1 to the seventh lens E7 are aspheric surfaces. Table 18 shows the high-order coefficients of the aspheric surfaces applicable in embodiment 9. Here, the surface types of the aspheric surfaces may be defined by the formula (1) given in the above Embodiment 1.

TABLE 18

| surface number | A4 | A6 | A8 | A10 | A12 | A14 | A16 | A18 | A20 |
|---|---|---|---|---|---|---|---|---|---|
| S1 | −2.9879E−02 | 1.1638E−02 | −8.1609E−02 | 1.5796E−01 | −1.9806E−01 | 1.5333E−01 | −6.9499E−02 | 1.6981E−02 | −1.7373E−03 |
| S2 | 5.0252E−02 | −3.3824E−01 | 4.5984E−01 | −2.8824E−01 | 3.9978E−02 | 7.0726E−02 | −5.3591E−02 | 1.6134E−02 | −1.8702E−03 |
| S3 | −8.4367E−02 | −2.7909E−03 | −1.1180E−01 | 5.5157E−01 | −8.5441E−01 | 7.2852E−01 | −3.7005E−01 | 1.0534E−01 | −1.3009E−02 |
| S4 | −7.2065E−02 | 1.3849E−01 | −1.8578E−01 | 1.3689E−01 | −3.3113E−02 | −1.5509E−02 | 1.0407E−02 | −1.8602E−03 | 3.1829E−05 |
| S5 | −1.3709E−01 | 1.8255E−01 | −1.8603E−01 | 1.5184E−01 | −1.2690E−01 | 1.3225E−01 | −1.0070E−01 | 3.9335E−02 | −5.9472E−03 |
| S6 | −4.4370E−02 | −3.5029E−03 | 2.7184E−01 | −6.6744E−01 | 9.4673E−01 | −8.3373E−01 | 4.6174E−01 | −1.4746E−01 | 2.1881E−02 |
| S7 | −6.6487E−02 | 1.2338E−01 | −5.6003E−01 | 1.4579E+00 | −2.5752E+00 | 3.0124E+00 | −2.2132E+00 | 9.2210E−01 | −1.6440E−01 |
| S8 | −1.5149E−01 | 1.7065E−01 | −6.9053E−01 | 2.3235E+00 | −5.0005E+00 | 6.1163E+00 | −4.1774E+00 | 1.4936E+00 | −2.1814E−01 |
| S9 | −2.0806E−01 | 2.8381E−01 | −1.0113E+00 | 3.1279E+00 | −6.0281E+00 | 6.6723E+00 | −4.1647E+00 | 1.3645E+00 | −1.8260E−01 |
| S10 | −1.1448E−01 | −5.3816E−02 | 1.1643E−01 | 1.1082E−01 | −4.8469E−01 | 5.5720E−01 | −3.1461E−01 | 8.9532E−02 | −1.0243E−02 |
| S11 | 1.1556E−02 | −1.7534E−01 | 1.4020E−01 | −4.4589E−02 | −1.5847E−02 | 1.3469E−02 | −2.2079E−03 | 0.0000E+00 | 0.0000E+00 |
| S12 | 8.4619E−02 | −2.1635E−01 | 1.7791E−01 | −1.0490E−01 | 5.7918E−02 | −2.3469E−02 | 5.6958E−03 | −7.3226E−04 | 3.8455E−05 |
| S13 | −9.7517E−02 | −1.5386E−01 | 2.0407E−01 | −9.3814E−02 | 2.2261E−02 | −2.8077E−03 | 1.4886E−04 | 2.6646E−06 | −4.5491E−07 |
| S14 | −2.0330E−01 | 1.3596E−01 | −7.1613E−02 | 3.0778E−02 | −1.0033E−02 | 2.2435E−03 | −3.1769E−04 | 2.5470E−05 | −8.7539E−07 |

In embodiment 9, the total effective focal length f of the optical imaging lens assembly=3.99 mm; the effective focal length f1 of the first lens E1=−25.51 mm; the effective focal length f2 of the second lens E2=2.97 mm; the effective focal length f3 of the third lens E3=−11.83 mm; the effective focal length f4 of the fourth lens E4=−45.58 mm; the effective focal length f5 of the fifth lens E5=47.68 mm; the effective focal length f6 of the sixth lens E6=2.90 mm; the effective focal length f7 of the seventh lens E7=−2.13 mm. The total track length TTL of the imaging lens assembly=4.99 mm. The half ImgH of the diagonal length of the effective pixel area on the image plane S17=3.41 mm.

Figure 18A:
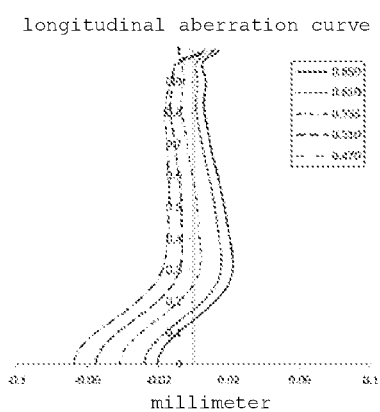
FIGS. 18A-18D respectively illustrate a longitudinal aberration curve, an astigmatic curve, a distortion curve and a lateral color curve of the optical imaging lens assembly according to Embodiment 9.
Figure 18B:
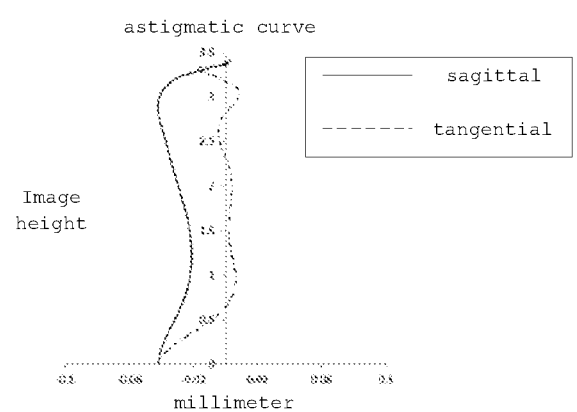
Figure 18C:
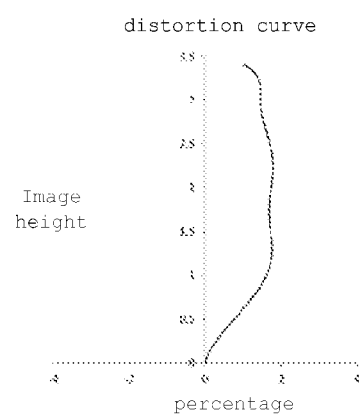
Figure 18D:
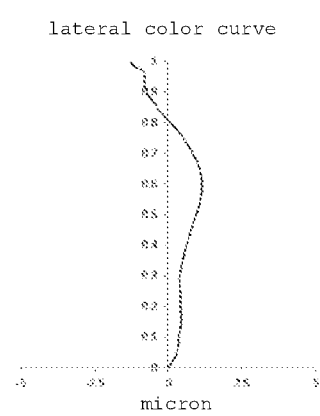

FIG. 18A shows the longitudinal aberration curve of the optical imaging lens assembly according to embodiment 9, representing deviations of focal points where lights of different wavelengths converge after passing through the lens assembly. FIG. 18B shows the astigmatic curve of the optical imaging lens assembly according to embodiment 9, representing a curvature of the tangential image plane and a curvature of the sagittal image plane. FIG. 18C shows the distortion curve of the optical imaging lens assembly according to embodiment 9, representing degrees of distortion at different viewing angles. FIG. 18D shows the lateral color curve of the optical imaging lens assembly according to embodiment 9, representing deviations of different heights of images on the image plane formed by light passing through the lens assembly. As can be seen according to FIGS. 18A to 18D, the optical imaging lens assembly according to embodiment 9 can achieve good imaging quality.

To sum up, Embodiments 1 to 9 respectively satisfy the relationships shown in Table 19.

TABLE 19

| conditional expression/embodiment | 1 | 2 | 3 | 4 | 5 | 6 | 7 | 8 | 9 |
|---|---|---|---|---|---|---|---|---|---|
| f/EPD | 1.59 | 1.59 | 1.59 | 1.59 | 1.58 | 1.58 | 1.58 | 1.60 | 1.46 |
| $|f/f4| + |f/f5|$ | 0.02 | 0.05 | 0.02 | 0.11 | 0.44 | 0.06 | 0.02 | 0.07 | 0.17 |
| f/f1 | −0.18 | −0.17 | −0.17 | −0.17 | −0.19 | −0.18 | −0.18 | −0.17 | −0.16 |
| f6/f7 | −1.35 | −1.39 | −1.38 | −1.32 | −1.36 | −1.44 | −1.39 | −1.35 | −1.36 |
| CT1/CT7 | 1.13 | 1.03 | 1.00 | 1.00 | 1.01 | 1.01 | 1.00 | 1.17 | 1.27 |
| f2/R3 | 1.88 | 1.73 | 1.81 | 1.79 | 1.87 | 1.85 | 1.85 | 2.46 | 1.99 |
| f6/R12 | −1.63 | −1.58 | −1.64 | −1.56 | −1.61 | −1.71 | −1.83 | −1.71 | −1.65 |
| CT4/CT5 | 1.40 | 0.98 | 1.28 | 1.01 | 1.59 | 1.14 | 1.09 | 1.29 | 1.33 |
| TTL/ImgH | 1.45 | 1.46 | 1.46 | 1.46 | 1.44 | 1.43 | 1.44 | 1.46 | 1.46 |
| (R5 + R6)/(R5 − R6) | 3.44 | 1.68 | 2.94 | 3.08 | 3.29 | 3.10 | 3.19 | 79.10 | 4.76 |
| $|R13/R14|$ | 1.76 | 1.74 | 1.69 | 1.71 | 1.76 | 1.85 | 1.91 | 1.65 | 1.37 |

The present disclosure further provides an imaging device, having a photosensitive element that may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging lens assembly, comprising sequentially, along an optical axis from an object side to an image side: a first lens, a second lens, a third lens, a fourth lens, a fifth lens, a sixth lens and a seventh lens, each of the first to seventh lenses having a refractive power, wherein,
   the first lens has a negative refractive power, an object-side surface of the first lens is a convex surface, and an image-side surface of the first lens is a concave surface;
   an image-side surface of the third lens is a concave surface;
   an object-side surface of the seventh lens is a concave surface;
   a total effective focal length f of the optical imaging lens assembly, an effective focal length f4 of the fourth lens, and an effective focal length f5 of the fifth lens satisfy: $|f/f4|+|f/f5|<1$; and
   a total track length TTL of the optical imaging lens assembly and a half of a diagonal length ImgH of an effective pixel area on an image plane of the optical imaging lens assembly satisfy: TTL/ImgH≤1.5.

2. The optical imaging lens assembly according to claim 1, wherein the total effective focal length f of the optical imaging lens assembly and an entrance pupil diameter EPD of the optical imaging lens assembly satisfy: f/EPD≤1.60.

3. The optical imaging lens assembly according to claim 1, wherein an effective focal length f1 of the first lens and the total effective focal length f of the optical imaging lens assembly satisfy: −0.5<f/f1<0.

4. The optical imaging lens assembly according to claim 1, wherein an effective focal length f2 of the second lens and a radius R3 of curvature of an object-side surface of the second lens satisfy: 1.5<f2/R3<2.5.

5. The optical imaging lens assembly according to claim 1, wherein an effective focal length f6 of the sixth lens and a radius R12 of curvature of an image-side surface of the sixth lens satisfy: −2<f6/R12<−1.

6. The optical imaging lens assembly according to claim 5, wherein the effective focal length f6 of the sixth lens and an effective focal length f7 of the seventh lens satisfy: −1.05<f6/f7<−1.

7. The optical imaging lens assembly according to claim 1, wherein a center thickness CT4 of the fourth lens on the optical axis and a center thickness CT5 of the fifth lens on the optical axis satisfy: 0.5<CT4/CT5<2.0.

8. The optical imaging lens assembly according to claim 7, wherein a center thickness CT1 of the first lens on the optical axis and a center thickness CT7 of the seventh lens on the optical axis satisfy: 1.00<CT1/CT7<1.50.

9. The optical imaging lens assembly according to claim 1, wherein a radius R5 of curvature of an object-side surface of the third lens and a radius R6 of curvature of the image-side surface of the third lens satisfy: $1.5<(R5+R6)/(R5-R6)\leq 80$.

10. The optical imaging lens assembly according to claim 1, wherein a radius R13 of curvature of the object-side surface of the seventh lens and a radius R14 of curvature of an image-side surface of the seventh lens satisfy: $|R13/R14|<2$.

11. An optical imaging lens assembly, comprising sequentially, along an optical axis from an object side to an image side: a first lens, a second lens, a third lens, a fourth lens, a fifth lens, a sixth lens and a seventh lens, each of the first to seventh lenses having a refractive power, wherein, an object-side surface of the first lens is a convex surface, and an image-side surface of the first lens is a concave surface;

an image-side surface of the third lens is a concave surface;

an object-side surface of the seventh lens is a concave surface;

a center thickness CT1 of the first lens on the optical axis and a center thickness CT7 of the seventh lens on the optical axis satisfy: $1.00\leq CT1/CT7<1.50$; and a total track length TTL of the optical imaging lens assembly and a half of a diagonal length ImgH of an effective pixel area on an image plane of the optical imaging lens assembly satisfy: $TTL/ImgH\leq 1.5$.

12. The optical imaging lens assembly according to claim 11, wherein a radius R13 of curvature of the object-side surface of the seventh lens and a radius R14 of curvature of an image-side surface of the seventh lens satisfy: $|R13/R14|<2$.

13. The optical imaging lens assembly according to claim 12, wherein a radius R5 of curvature of an object-side surface of the third lens and a radius R6 of curvature of the image-side surface of the third lens satisfy: $1.5<(R5+R6)/(R5-R6)\leq 80$.

14. The optical imaging lens assembly according to claim 11, wherein an effective focal length f6 of the sixth lens and a radius R12 of curvature of an image-side surface of the sixth lens satisfy: $-2<f6/R12<-1$.

15. The optical imaging lens assembly according to claim 11, wherein an effective focal length f6 of the sixth lens and an effective focal length f7 of the seventh lens satisfy: $-1.5<f6/f7<-1$.

16. The optical imaging lens assembly according to claim 11, wherein a total effective focal length f of the optical imaging lens assembly, an effective focal length f4 of the fourth lens, and an effective focal length f5 of the fifth lens satisfy: $|f/f4|+|f/f5|<1$.

17. The optical imaging lens assembly according to claim 11, wherein an effective focal length f2 of the second lens and a radius R3 of curvature of an object-side surface of the second lens satisfy: $1.5<f2/R3<2.5$.

18. The optical imaging lens assembly according to claim 11, wherein an effective focal length f1 of the first lens and a total effective focal length f of the optical imaging lens assembly satisfy: $-0.5<f/f1<0$.

19. The optical imaging lens assembly according to claim 11, wherein a center thickness CT4 of the fourth lens on the optical axis and a center thickness CT5 of the fifth lens on the optical axis satisfy: $0.5<CT4/CT5<2.0$, wherein the total effective focal length f of the optical imaging lens assembly and an entrance pupil diameter EPD of the optical imaging lens assembly satisfy: $f/EPD\leq 1.60$.

* * * * *